United States Patent
Howard et al.

(10) Patent No.: US 10,867,224 B2
(45) Date of Patent: Dec. 15, 2020

(54) OCCLUSION-RESILIENT OPTICAL CODES FOR MACHINE-READ ARTICLES

(71) Applicant: 3M INNOVATIVE PROPERTIES COMPANY, St. Paul, MN (US)

(72) Inventors: James W. Howard, Circle Pines, MN (US); Justin M. Johnson, Hudson, WI (US); Deepti Pachauri, Minneapolis, MN (US); James B. Snyder, Minneapolis, MN (US); Guruprasad Somasundaram, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/335,698

(22) PCT Filed: Sep. 27, 2017

(86) PCT No.: PCT/US2017/053788
§ 371 (c)(1),
(2) Date: Mar. 22, 2019

(87) PCT Pub. No.: WO2018/064203
PCT Pub. Date: Apr. 5, 2018

(65) Prior Publication Data
US 2020/0019827 A1 Jan. 16, 2020

Related U.S. Application Data

(60) Provisional application No. 62/485,426, filed on Apr. 14, 2017, provisional application No. 62/400,874, filed on Sep. 28, 2016.

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 7/1473* (2013.01); *G06K 19/06056* (2013.01)

(58) Field of Classification Search
CPC ....... G06K 19/06037; G06K 19/06056; G06K 19/06075; G06K 7/1417; G06K 7/1473
See application file for complete search history.

(56) References Cited

U.S. PATENT DOCUMENTS

| | | | |
|---|---|---|---|
| 3,758,193 A | 9/1973 | Tung | |
| 5,223,701 A | 6/1993 | Batterman | |

(Continued)

FOREIGN PATENT DOCUMENTS

| | | |
|---|---|---|
| CN | 101964145 | 2/2011 |
| CN | 102103764 | 6/2011 |

(Continued)

OTHER PUBLICATIONS

Clarke, "Reed-Solomon Error Correction", R&D White Paper WHP031, 2002, URL <http://downloads.bbc.co.uk/rd/pubs/whp/whp-pdffiles/WHP031.pdf>, pp. 1-47.

(Continued)

*Primary Examiner* — Thien M Le
(74) *Attorney, Agent, or Firm* — Jonathan L. Tolstedt

(57) ABSTRACT

In some examples, an article includes a substrate and a plurality of optical element sets embodied on the substrate, wherein each optical element set includes a plurality of optical elements, wherein each respective optical element represents an encoded value in a set of encoded values, wherein the set of encoded values are differentiable based on visual differentiability of the respective optical elements, wherein each respective optical element set represents at least a portion of a message or error correction data to decode the message if one or more of the plurality of optical (Continued)

element sets are visually occluded, and wherein the optical element sets for the message and error correction data are spatially configured at the physical surface in a matrix such that the message is decodable from the substrate without optical elements positioned within at least one complete edge of the matrix that is visually occluded.

20 Claims, 20 Drawing Sheets

(56) References Cited

U.S. PATENT DOCUMENTS

| | | | |
|---|---|---|---|
| 5,591,956 | A | 1/1997 | Longacre, Jr. |
| 5,612,524 | A | 3/1997 | Sant' Anselmo |
| 5,726,435 | A | 3/1998 | Hara |
| 6,751,352 | B1 | 6/2004 | Baharav |
| 6,832,728 | B2 | 12/2004 | Kennedy |
| 7,032,823 | B2 | 4/2006 | Nojiri |
| 7,264,174 | B2 | 9/2007 | Chang |
| 7,387,393 | B2 | 6/2008 | Reich |
| 7,543,748 | B2 | 6/2009 | Kiliccote |
| 7,980,480 | B2 | 7/2011 | Lapstun |
| 8,430,315 | B2 | 4/2013 | Maybaum |
| 8,434,690 | B2 | 5/2013 | Ushijima |
| 8,865,293 | B2 | 10/2014 | Smithson |
| 9,594,993 | B2 * | 3/2017 | Picard ............... G06K 7/1417 |
| 9,791,865 | B2 | 10/2017 | Kelso |
| 10,417,541 | B1 | 9/2019 | Mishra et al. |
| 2003/0174865 | A1 | 9/2003 | Vernon |
| 2009/0057420 | A1 | 3/2009 | Onoda |
| 2010/0151213 | A1 | 6/2010 | Smithson |
| 2011/0042462 | A1 | 2/2011 | Smith |
| 2012/0148105 | A1 | 6/2012 | Burry |
| 2012/0256000 | A1 * | 10/2012 | Cok ..................... G06K 7/1447 235/462.22 |
| 2014/0103122 | A1 | 4/2014 | Lundell |
| 2015/0294130 | A1 | 10/2015 | Stein |
| 2016/0124431 | A1 | 5/2016 | Kelso |
| 2018/0197052 | A1 | 7/2018 | Yanson et al. |
| 2018/0253616 | A1 | 9/2018 | Johnson et al. |

FOREIGN PATENT DOCUMENTS

| | | |
|---|---|---|
| EP | 0416742 | 3/1991 |
| EP | 2105868 A1 * | 9/2009 |
| WO | WO 2008-007076 | 1/2008 |
| WO | WO 2008-118610 | 10/2008 |
| WO | WO 2011-044149 | 4/2011 |
| WO | WO 2013-149142 | 10/2013 |
| WO | WO 2015-067725 | 5/2015 |
| WO | WO 2016-025207 | 2/2016 |
| WO | WO 2016-109620 | 7/2016 |
| WO | WO 2017-151202 | 9/2017 |
| WO | WO 2017-176758 | 10/2017 |
| WO | WO 2018-064198 | 4/2018 |
| WO | WO 2018-064212 | 4/2018 |
| WO | WO 2018-151761 | 8/2018 |
| WO | WO 2019-082162 | 5/2019 |

OTHER PUBLICATIONS

Reed, "Polynomial Codes Over Certain Finite Fields", Journal for the Society for Industrial and Applied Mathematics, 1960, vol. 08, No. 02, pp. 300-304.

International Search Report for PCT International Application No. PCT/US2017/053788, dated Jan. 17, 2018, 4 pages.

* cited by examiner

OCCLUSION-RESILIENT OPTICAL CODES FOR MACHINE-READ ARTICLES

TECHNICAL FIELD

The present disclosure relates to encoding information on a physical surface of an article and systems for encoding and decoding such information.

BACKGROUND

Barcodes are generally an optical machine-readable representation of data or information. Some barcodes represented data by systematically varying the widths and spacing's of parallel lines. These types of barcodes are commonly referred to as linear or one-dimensional (1D) barcodes. The data or information encoded in a barcode may relate to the object to which the barcode is attached.

Later, two-dimensional (2D) bar-codes were developed. These barcodes used geometric patterns in two-dimensions to encode data. A common type of 2D barcode is the quick response (QR) code, which is a matrix-type code in the shape of a square. A QR code often includes three distinctive squares at its corners that define the bounds and orientation of the code and a smaller square near the fourth corner that is used to normalize the image for size, orientation, and angle of viewing.

Information is encoded in a QR code using 8-bit characters, where each bit is represented by either a white or black square. The bits are arranged in a basic matrix or grid pattern, where each bit is the same sized square. When the matrix is created, code words follow two-pixel wide strips that zig-zag up and down from right to left in the code from the bottom right corner and navigating around other elements of the codes. In QR codes, the encoded information typically follows a standardized layout scheme to allow decoding devices to reliably retrieve the encoded information. The number of characters that can be encoded in a QR code is dependent on the size of each bit, the size of the QR code itself, the size of the alphabet of characters and the level of error correction used. Generally, the higher the error correction level, the less the storage capacity. Even in view of existing technology related to bar codes, various shortcomings exist in barcodes, and signs or other articles containing such barcodes.

SUMMARY

Articles, techniques, and systems of this disclosure are directed to an occlusion-resistant, machine-readable code that encodes a message, wherein the machine-readable code is embodied on an article and is decodable by a computing device that receives an image of the code. The machine-readable code may be structured as a matrix of optical elements, wherein each optical element represents an encoded value (e.g., '1' or '0' in a binary encoding) of the message based on the optical element's visual appearance. Unlike QR codes, machine-readable codes of this disclosure may be spatially configured in the matrix to be decodable without relying on optical elements positioned within at least one complete edge of the matrix that is visually occluded. In this way, the machine-readable codes are particularly resilient to edge occlusions of articles, such as traffic signs where an entire edge of a traffic sign may be visually occluded by a building, vehicle, or horizon. Computational techniques of this disclosure may spatially arrange sets of optical elements in the matrix based on data indicating known regions or areas of the sign that will be occluded or are likely to be occluded. Such computation techniques may spatially arrange different sets of optical elements that include respective encoded values for the message and error correction data to reconstruct the message if one or more optical elements with encoded values for the message are occluded. In this way, if an edge of the matrix with optical elements representing encoded values of a message is visually occluded, a computing device may still be able to decode the message using error correction data in conjunction with other non-occluded optical elements representing encoded values of the message.

In some examples, an article includes a substrate with a physical surface; a plurality of optical element sets embodied on the physical surface, wherein each optical element set of the plurality of optical element sets includes a plurality of optical elements, wherein each respective optical element represents an encoded value in a set of encoded values, wherein the set of encoded values are differentiable based on visual differentiability of the respective optical elements, wherein each respective optical element set represents at least a portion of a message or error correction data to decode the message if one or more of the plurality of optical element sets are visually occluded, and wherein the optical element sets for the message and error correction data are spatially configured at the physical surface in a matrix such that the message is decodable from the substrate without optical elements positioned within at least one complete edge of the matrix that is visually occluded.

In some examples, a method includes: receiving, by a computing device an image of an article having a substrate that includes a physical surface, wherein a plurality of optical element sets embodied on the physical surface, wherein each optical element set of the plurality of optical element sets includes a plurality of optical elements, wherein each respective optical element represents an encoded value in a set of encoded values, wherein the set of encoded values are differentiable based on visual differentiability of the respective optical elements, wherein each respective optical element set represents at least a portion of a message or error correction data to decode the message if one or more of the plurality of optical element sets are visually occluded, wherein the optical element sets for the message and error correction data are spatially configured at the physical surface in a matrix such that the message is decodable from the substrate without optical elements positioned within at least one complete edge of the matrix that is visually occluded, and decoding, by the computing device, the message based at least in part on error correction data from the image in which at least one complete edge of the matrix that is visually occluded.

In some examples, a system includes: an image capture device; and a computing device communicatively coupled to the image capture device, the computing device comprising one or more computer processors and a memory comprising instructions that when executed by the one or more computer processors cause the one or more computer processors to: receive an image of an article having a substrate that includes a physical surface, wherein a plurality of optical element sets embodied on the physical surface, wherein each optical element set of the plurality of optical element sets includes a plurality of optical elements, wherein each respective optical element represents an encoded value in a set of encoded values, wherein the set of encoded values are differentiable based on visual differentiability of the respective optical elements, wherein each respective optical element set represents at least a portion of a message or error correction data to decode the message if one or more of the plurality of optical element sets are visually occluded, wherein the optical element sets for the message and error correction data are spatially configured at the physical surface in a matrix such that the message is decodable from the substrate without optical elements positioned within at least one complete edge of the matrix that is visually occluded, and decode, the message based at least in part on error correction data, from the image in which at least one complete edge of the matrix that is visually occluded.

The details of one or more examples are set forth in the accompanying drawings and the description below. Other features, objects, and advantages of the disclosure will be apparent from the description and drawings, and from the claims.

DETAILED DESCRIPTION

Figure 1A:
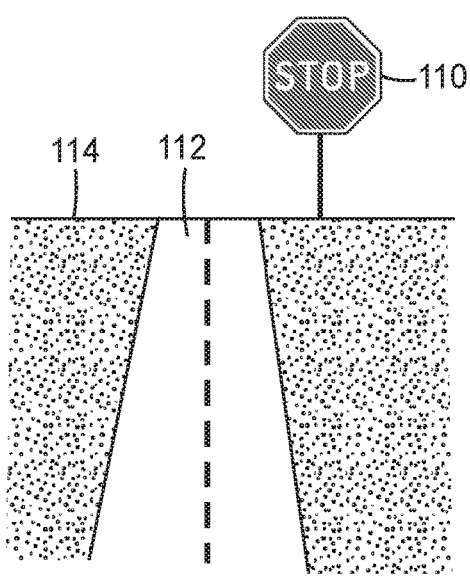
FIGS. 1A-1D illustrates occlusion scenarios with road signs.
Figure 1B:
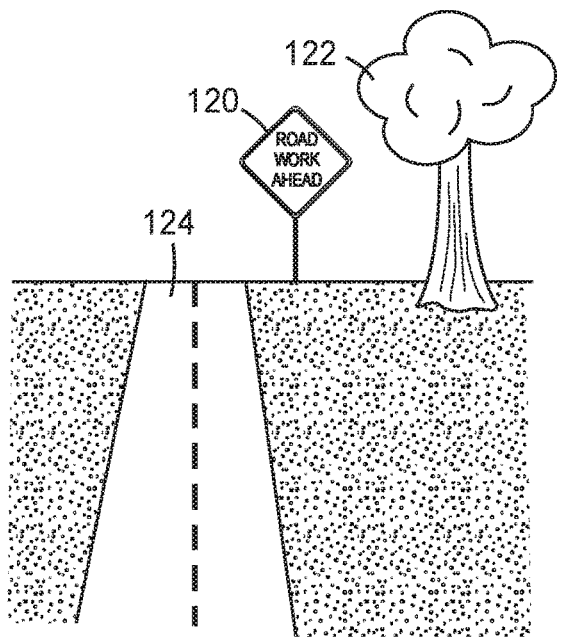
Figure 1C:
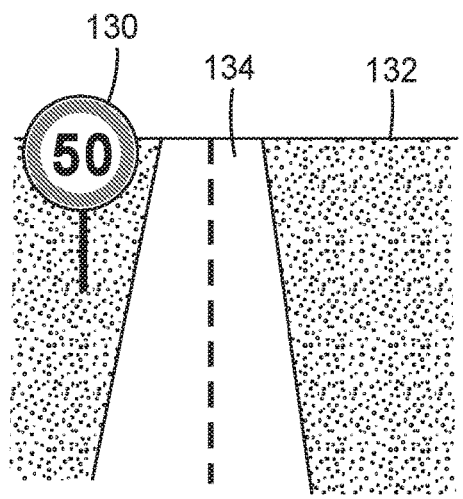
Figure 1D:
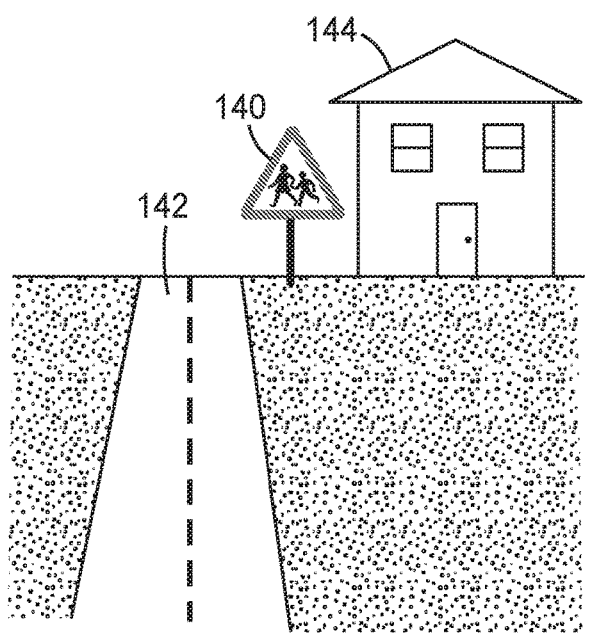

FIGS. 1A-1D illustrate occlusion scenarios with road signs, in accordance with articles and techniques of this disclosure. The scenarios shown in FIGS. 1A-1D are scenarios commonly experienced by drivers of vehicles. One of the objects of the present disclosure include providing a machine-readable optical code that can be accurately detected from a traffic sign and decoded, even when a portion of the sign is occluded. Machine-readable optical codes of this disclosure are not QR codes, and may provide one or more advantages over QR codes as will be evident from this disclosure. FIG. 1A illustrates stop sign 110 located after the crest of hill 114, such that a full view of sign 110 would be partially blocked by hill 114 from the perspective of a vehicle on road 112. FIG. 1B illustrates road work ahead sign 120 that may be partially obscured or occluded by tree 122, such that a vehicle on road 124 would be unable to view the entire sign 120. FIG. 1C illustrates a speed limit sign 130 that is partially obscured by curve 134 such that a vehicle on road 132 would be unable to view the entire sign 130. FIG. 1D illustrates a crossing sign 140 that is partially obscured by house 144 such that a vehicle on road 142 would be unable to view the entire sign 140. In some examples, one or more of signs 110, 120, 130, and 140 may include information encoded thereon in accordance with techniques of this disclosure. Although articles, systems and techniques of the disclosure are described with respect to traffic signs, other articles may include a license plate, a garment, or a decal.

Figure 2A:
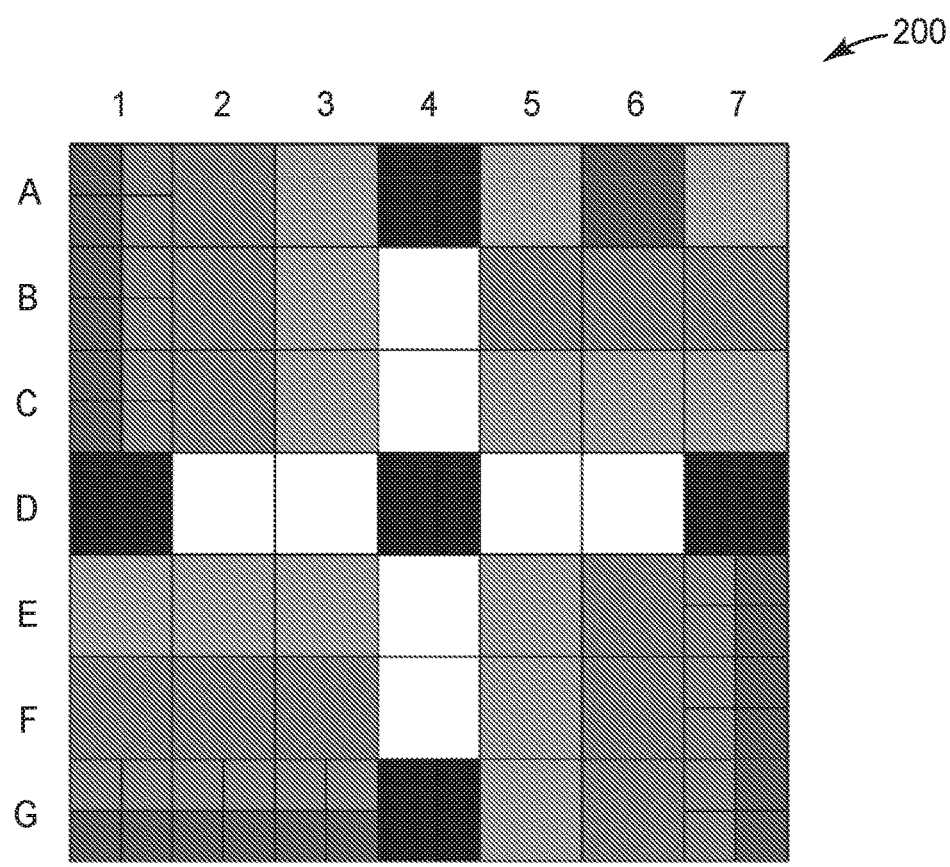
FIG. 2A is a machine-readable optical code with rows and columns optimized for occlusion.

FIG. 2A illustrates a machine-readable optical code 200 (or "code 200") with rows and columns configured to be resilient to visual occlusions, such that information encoded in code 200 may be accurately read or decoded even if portions of the code 200 are obscured, such as in scenarios described in FIGS. 1A-1D. As described in this disclosure, a machine-readable code may represent of binary or n-ary information and which may not be readable and/or contain information meaningful to a human. For instance, n-ary information may be represented using a base-n character or number system. Code 200 is multi-dimensional data matrix made up of squares or optical elements oriented in a con-figuration comprising rows and columns. In some examples, the terms "optical elements" and "modules" may be used interchangeably.

As shown in FIG. 2A, code 200 may represent a binary code in that some optical elements represent a bit of data, and is either white or black, with the colors white and black corresponding to "0" and "1", respectively, to encode machine-readable information in the code. Any possible encoding scheme, such as binary in the foregoing example, may be used. More generally, an optical element may, based on its visual appearance (e.g., gradient value), represent an encoded value in a set of encoded values, wherein a size of the set of encoded values corresponds to a number of different, possible gradient values that may be assigned to a particular optical element. Any number of different sets of encoded values may be used, such as alphabetic characters, numeric characters, or any other symbols. As shown in FIG. 2, the encoded values are differentiable based on visual differentiability of the respective optical elements. For purposes of illustration, the squares shown in FIG. 2A include n-ary gradients of shadings to illustrate different encoded values in code 100 as n-ary encoded values.

In some examples, wherein a set of encoded values includes N-number of encoded values. An optical element set may include M-number of optical elements, wherein an optical element set represents a combination of encoded values of a set of $N^M$ combinations of encoded values based at least in part on respective visual gradient values assigned to respective optical elements of the optical element set. In some examples, the respective gradient values are each included in a set of M-number of visually differentiable gradient values.

In some examples, each respective optical element set (or "block") represents at least a portion of a message or represents error correction data to decode the message if one or more of the plurality of optical element sets are visually occluded. When a message is encoded, for example, from a raw message to an encoded message, the encoded message may be partitioned into different optical element sets such that the raw message is decodable from the substrate without optical elements positioned within at least one complete edge of the matrix that is visually occluded, as further described in this disclosure. While the optical elements in FIG. 2A are shown as squares, optical elements consistent with the present disclosure may be of any shape.

In some examples, code 200 may include one or more of three general types of optical elements: finder optical elements, context optical elements and content optical elements. Finder optical elements in FIG. 2A are the optical elements in row D and column 4 (a total of 13 optical elements). Specifically, optical elements A4, D1, D4, D7 and G4 are "0's" and the remainder of the finder optical elements are "1's". Finder optical elements may enable a machine vision system to recognize a 2D barcode in an image, or to localize an optical code within an image, including the outer edges of code 200.

Finder codes or optical elements enable a machine or machine vision system to sort through a variety of lines and other visual features that appear in an image in order to determine where an optical code spatially begins and ends. Finder codes or optical elements are typically fixed in position and sufficiently visually distinct or complex such that they would not normally occur in nature. Designing finder codes or optical elements in this way allows a machine vision to have reasonable certainty that it has identified a 2D code that it should decode. A more complex finder code increases the likelihood that the machine vision system will find and decode a 2D code. More visually complex finder codes may require an increase number of finder optical elements required to implement the code, and can result in smaller optical element size (which can increase the likelihood of optical element occlusion and misreading), and fewer remaining optical elements to use for encoding data or information.

In some configurations, finder optical elements enable a machine vision system to determine the orientation of a 2D barcode. However, in other applications, the orientation of a 2D barcode can be assumed by a computing device processing the image of the 2D barcode (such as when the 2D barcode is on a sign or stationary object). In these applications, fewer finder optical elements (and bits of information) are required because orientation information is not required by the computing device to be encoded. The finder optical element as shown in code 200 can be quickly identified through a raster scan. In one instance, an optical code consistent with the present disclosure includes fewer than 36 finder optical elements. In another instance, an optical code consistent with the present disclosure includes, for example, fewer than 25, 23, 21, 19, 17, 15 or 13 finder optical elements.

The table below shows the number of finder optical elements, context optical elements, content optical elements, total optical elements and bits of data that can be encoded in optical codes of various sizes consistent with the present disclosure. While these are examples of codes sizes, other codes of varying sizes consistent with the present disclosure can be created extrapolating the optical element information below. In the table below, the number of finder optical elements is based on a crossed centric pattern for finder optical elements. There may be more or fewer finder optical elements depending on the pattern used. Additionally, the number of content optical elements listed assumes that content optical elements are 25% of the area of a standard or context optical element. A code may be designed with more or fewer context or content optical elements depending on the need of the desired application. The number of encoded data bits compensates for the variability between content and context optical elements and assumes that each standard bit size encodes one bit of data (excluding the finder optical elements).

TABLE 1

Example code sizes and optical element distribution

| Finder Optical elements | Context Optical elements | Content Optical elements | Total Optical elements | Encoded Data Bits |
|---|---|---|---|---|
| 13 | 24 | 36 | 76 | 63 |
| 17 | 48 | 48 | 117 | 100 |
| 21 | 80 | 60 | 166 | 145 |
| 25 | 120 | 72 | 223 | 198 |
| 29 | 168 | 84 | 288 | 259 |
| 33 | 224 | 96 | 361 | 328 |
| 37 | 288 | 108 | 442 | 405 |
| 41 | 360 | 120 | 531 | 490 |

Finder optical elements can be arranged in a variety of ways in an optical code 200. While finder optical elements are arranged in a centric crossed pattern in code 200, other placements or configurations for finder optical elements include placing three white optical elements at each corner. An additional variation of includes alternating clocking pixels (white, black) along one or more edges between adjacent corner optical elements. Other locations for finder optical elements in a code consistent with the present disclosure will be apparent to one of skill in the art upon reading the present disclosure.

Context optical elements may represent bits or elements that encode machine-readable data or information related to the article or object, or location or environment of the article or object, on which code 200 is embodied. In one instance, context optical elements are the same size as finder optical elements, and are detectable by a machine vision system from a first distance, the same distance at which the finder optical elements are detectable. Such a distance is dependent upon the size of 2D code, the number of optical elements in the 2D code, the size of each optical element and the resolution of the machine vision system detecting the 2D code. Examples of data encoded in context optical elements include: location of article or object, manufacturing information related to article or object, classification of a traffic sign the code is on, law or other driving restrictions applicable to a particular area, time, date or weather conditions, the traffic lanes to which the sign applies. Other types of information will be apparent to one of skill in the art upon reading the present disclosure. In FIG. 2A, optical elements A2, A3, B2, B3, B5, B6, B7, C2, C3, C5, C6, C7, E1, E2, E3, E5, E6, F1, F2, F3, F5, F6, G5 and G6 are all context optical elements. Of these optical elements, for purposes of illustration only, optical elements A2, B2, B5, B6, B7, C2, E6, F1, F2, F3, F6, and G6 are correspond to "1's" and the remainder of the context optical elements are "0's" because mapping between the gradient color or shading for 1's corresponds to the gradient color or shading for optical elements A2, B2, B5, B6, B7, C2, E6, F1, F2, F3, F6, and G6.

A variety of coding techniques can be used to encode information into code 200. One such exemplary technique is a Reed-Solomon code, as will be understood by one of skill in the art, and as described in "Reed-Solomon Error Correction by C. K. P. Clarke, R&D White Paper WHP031, July 2002, available at: http://downloads.bbc.co.uk/rd/pubs/whp/whp-pdf-files/WHP031.pdf, incorporated herein by reference. Other types of error correction codes that could be used consistent with the present disclosure include a Golay code, a Low Density Parity Check code, and a Turbo code. Other types of codes will be apparent to one of skill in the art. In code 200, using a base three extended Reed-Solomon code, the context optical elements may embed 12 bits of information in the 24 total context optical elements. Up to two optical elements may be occluded or lost, and the data encoded in the context optical elements is still recoverable. Using the encoding for code 200 described herein, if the context optical elements represent the type of sign, up to 4096 unique signs may be classified.

Code 200 also includes 36 content optical elements, four of each are in larger optical elements A1, B1, C1, E7, F7, G1, G2, G3 and G7. In some examples, content optical elements are detectable by a machine vision system from a second distance (but not detectable by a machine vision system at a first distance), and the second distance is less than the first distance. For instance, due to the size of content optical elements, such content optical elements may not be individually decodable at distances between the code and an image capture device that are greater than a threshold distance. Content optical elements may represent bits or elements that encode machine-readable data or information related to the article or object, or location and environment of the article or object, on which code 200 is embodied. Content optical elements can be used to extend information encoded in context optical elements. For example, if a context optical element indicates that the article is a speed limit sign, content optical elements may be used to indicate that the speed limit is 55 miles per hours in the zone the sign is located in. The distance at which content optical elements may be read by a machine vision system may be dependent upon the size of the code 200, the number of optical elements in code 200, the size of each optical element, and the resolution of the machine vision system.

The content optical elements in A1, B1, C1, E7, F7, G1, G2, G3 and G7 may encode a variety of types of information, including information specific to a sign, such as a speed limit, instructional information, GPS coordinates, or an asset number. Content optical elements can also be used to operate as further error correction for context optical elements.

Data may be encoded in content optical elements in a variety of ways or using a variety of algorithms. One such algorithm is a base-6 Reed-Solomon code, which allows for 12 bits of data to be encoded in the content optical elements. Because the content codes are generally smaller than context codes, the likelihood of a content optical element being misread or occluded from the field of vision of the machine vision system maybe higher than other larger-sized optical elements. Using a base-6 Reed-Solomon encoding scheme may provide for additional redundancy or error-checking as compared to the base-3 Reed-Solomon code for the context optical elements. Up to 12 of the adjacent content optical elements can be occluded in this specific configuration, and the data from the content optical elements can be read accurately.

Optical elements A5, A6 and A7 may be used to add custom data to a sign at time of installation. In one instance, they may all appear white, and information, such as the lane the sign applies to, can be indicated by an installer by adding an IR black material over the desired optical elements.

While code 200 is shown as a 7×7 matrix, as determined by the size of the finder optical elements, other codes are within the scope of the present disclosure. For example, a code may be 8×8, 9×9, 10×10, 11×11, 12×12, 13×13, N×N, or N×M. In some configurations, a code consistent with the present disclosure may not be a square matrix. An optical code may be circular, triangular, a polygon, rectangle, or any desired irregular shape. The size of such an optical code can be determined by calculating the total number of standard optical elements, using the size of a finder optical element to determine the standard size of a single optical element.

Figure 2B:
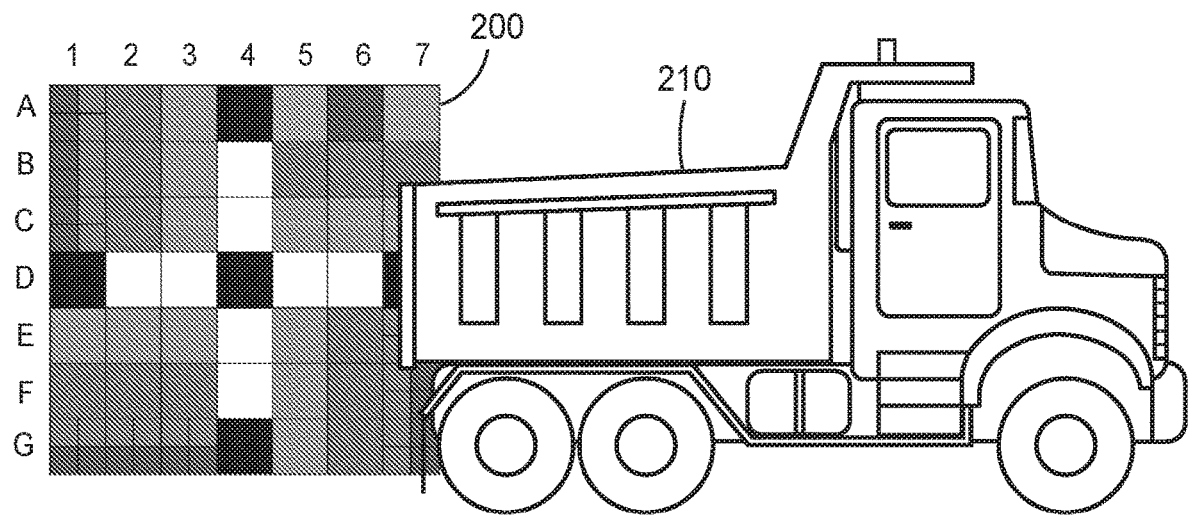
FIG. 2B is the machine-readable optical code of FIG. 2A with an occlusion.

FIG. 2B is the machine-readable optical code of FIG. 2A with an occlusion in the form of truck 210. Any occlusion can be any impediment that prevents light from passing from a source to an observer (either human or non-human (e.g., image capture device)). As discussed above, the context optical elements encode 12 bits of information when using a Reed-Solomon algorithm. The data is encoded in the context optical elements such that the context optical elements are grouped into four 6-bit blocks (or "optical element sets"). Specifically, the context optical elements are grouped as follows:

Context optical element block 1: A2, A3, B2, B3, C2, C3
Context optical element block 2: B5, B6, B7, C5, C6, C7
Context optical element block 3: E1, E2, E3, F1, F2, F3
Context optical element block 4: E5, E6, F5, F6, G5, G6

Two of the context optical element blocks are used to encode data (or as data payload), and two blocks are used for error correction. In the code shown, if any one of the top row, bottom, row, left column or right column is occluded, the machine vision system can still detect at least two complete blocks of content optical elements, leaving at least a one complete context optical element block dedicated to data payload (e.g., encoded message or encoded values representing the encoded message) and at least one complete context optical element block dedicated to error correction. In this instance, the data encoded in the context optical elements is then fully recoverable, even though an entire row or column has been occluded.

As shown in FIG. 2B, truck 210 occludes the majority of column 7, including context optical elements B7 and C7. As described above, even though context optical elements B7 and C7 are occluded, the context optical element data payload is fully recoverable because context optical element blocks 1, 3 and 4 are not occluded, and the non-occluded blocks include the encoded data and corresponding error correct data to reconstruct the data payload.

FIG. 2B includes content optical elements in squares: A1, B1, C1, E7, F7, G1, G2, G3 and G7. A parent optical element, or referred to as "square", in some examples, may include one or more child optical elements. For instance, a parent optical element may include four child optical elements as shown in FIG. 1. The content optical elements are grouped into six 6-bit blocks, where two of the blocks are used for data payload and four of the blocks are used for error correction.

Using Reed-Solomon error correcting, the number of blocks that can be recovered due to a compromised read is equal to the total number of error correcting blocks divided by two. In some embodiments of the present disclosure, the blocks are arranged so that if an entire edge of a code is occluded, it results in occluding a minimum number of blocks, allowing for greater recovery. Therefore, in the code 200, because there are two error correction context blocks, up to one compromised context block can be recovered. Even if either of the left column or bottom row is entirely occluded, the machine vision system is still able to read a complete data payload block and a complete error correction block, resulting in full recovery of the data encoded in the content optical elements. In some examples, optical element sets for a message and error correction data are spatially configured at the physical surface in a matrix such that the message is decodable from the substrate without optical elements positioned within at least one complete edge of the matrix that is visually occluded.

In some examples, more than 50% of the at least one complete edge is occluded. In some examples, more than 75% of the at least one complete edge is occluded. In some examples, the amount of occlusion in the at least one edge is within a range of 50-100% occluded. In some examples, the at least one edge is entirely occluded. In some examples, an additional edge, adjacent to the at least one edge is occluded. In some examples, multiple adjacent edges are occluded. In some examples, each of the one or more multiple adjacent edges are occluded more than 50%, more than 75%, or included an amount of occlusion within a range of 50-100%.

In some examples, the at least one complete edge comprises a one-dimensional array from the lowest ordered index to the highest-ordered index of at least a horizontal or a vertical dimension of the matrix. For instance, an edge in FIG. 2A may be all elements of row A, all elements of row G, all elements of column 1, or all elements of column 7.

Figure 3A:
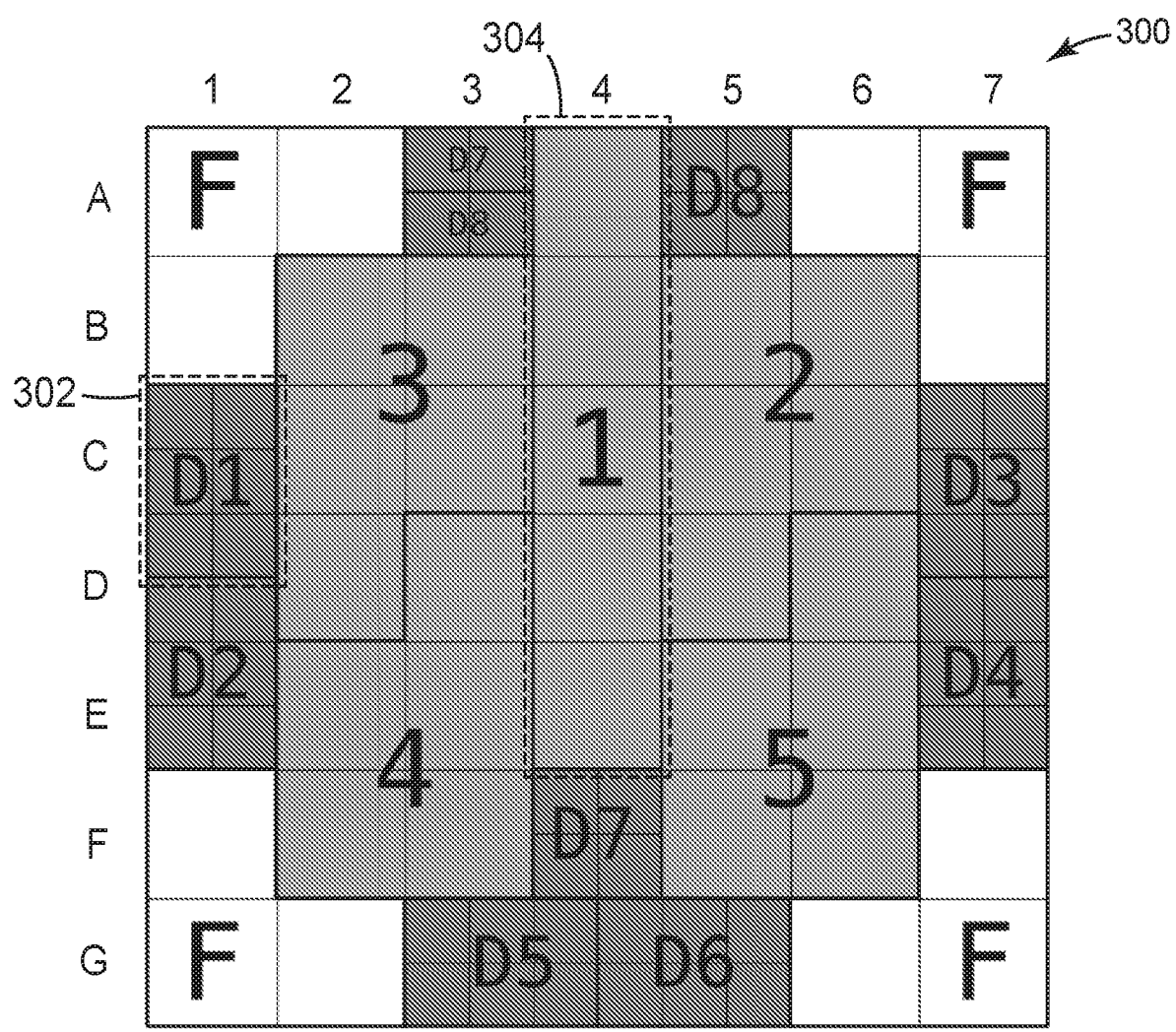
FIG. 3A is an example of a machine-readable optical code.

FIG. 3A is an example of a machine-readable optical code 300. Optical code 300 includes twelve finder optical elements located at the corners of optical code 300: A1, A2, A6, A7, B1, B7, F1, F7, G1, G2, G6 and G7. Groups or blocks of finder optical elements are indicated by "F" in FIG. 3A. Context optical elements are generally located near the center of optical code 300, and blocks of context optical elements are numbered 1-5. The context optical element blocks include the following optical elements:

Context Block 1: A4, B4, C4, D4, E4;
Context Block 2: B5, B6, C5, C6, D5;
Context Block 3: B2, B3, C2, C3, D2;
Context Block 4: D3, E3, E4, F3, F4; and
Context Block 5: D6, E5, E6, F5, F6.

The context blocks are used such that context block 1 is a data payload block, and context blocks 2-5 are each dedicated to Reed-Solomon error correction. This allows correction of up to two incorrectly read context blocks. Because content block 1 has 5 optical elements or bits, it can represent up to $2^5$ (or 32) values or classes of vehicles (or any desired classification set). In other words, up to three columns (1, 2, and 3 or 5, 6 and 7) from the left or right can be entirely occluded, or up two rows on the bottom (F and G) can be entirely occluded and the context data can still be correctly decoded. The certainty associated with decoding and recovering occluded data is based on the particular type of encoding algorithm used.

FIG. 3A includes eight blocks of content optical elements, with each block containing six optical elements. The content optical element blocks are indicated as D1-D8 in FIG. 3A. Example optical element block 302 represents content optical element block D1. Example optical element block 304 represents context optical element block 1. As shown in FIG. 3A, content optical element blocks D7 and D8 are distributed across more than one contiguous region of optical code 300. The optical elements in each content optical element block are as follows:

Content Block D 1: C 1 and the top half of D1
Content Block D2: The bottom half of D1 and E1
Content Block D3: C7 and the top half of D7
Content Block D4: The bottom half of D7 and E7
Content Block D5: G3 and the left half of G4
Content Block D6: The right half of G4 and G5
Content Block D7: The top half of A3 and F4; and
Content Block D8: The bottom half of A3 and A5.

Of the eight content blocks, four content blocks (D1-D4) are used for data payload and four content blocks (D5-D8) are used for Reed-Solomon error correction, so a machine vision system of this disclosure can correct up to two content block errors when reading code 300. With four content blocks being used for data payload, the content blocks can encode up to $2^{24}$ (or 16,777,216) unique codes.

FIG. 3A shows a configuration for a 7×7 optical-element-size optical code, using the size of the finder optical elements to determine the standard optical element size. Optical code 300, while requiring only 12 finder optical elements is able to encode 32 unique values in context optical elements and 16,777,216 unique values in context optical elements while withstanding substantial occlusion as discussed herein.

Figure 3B:
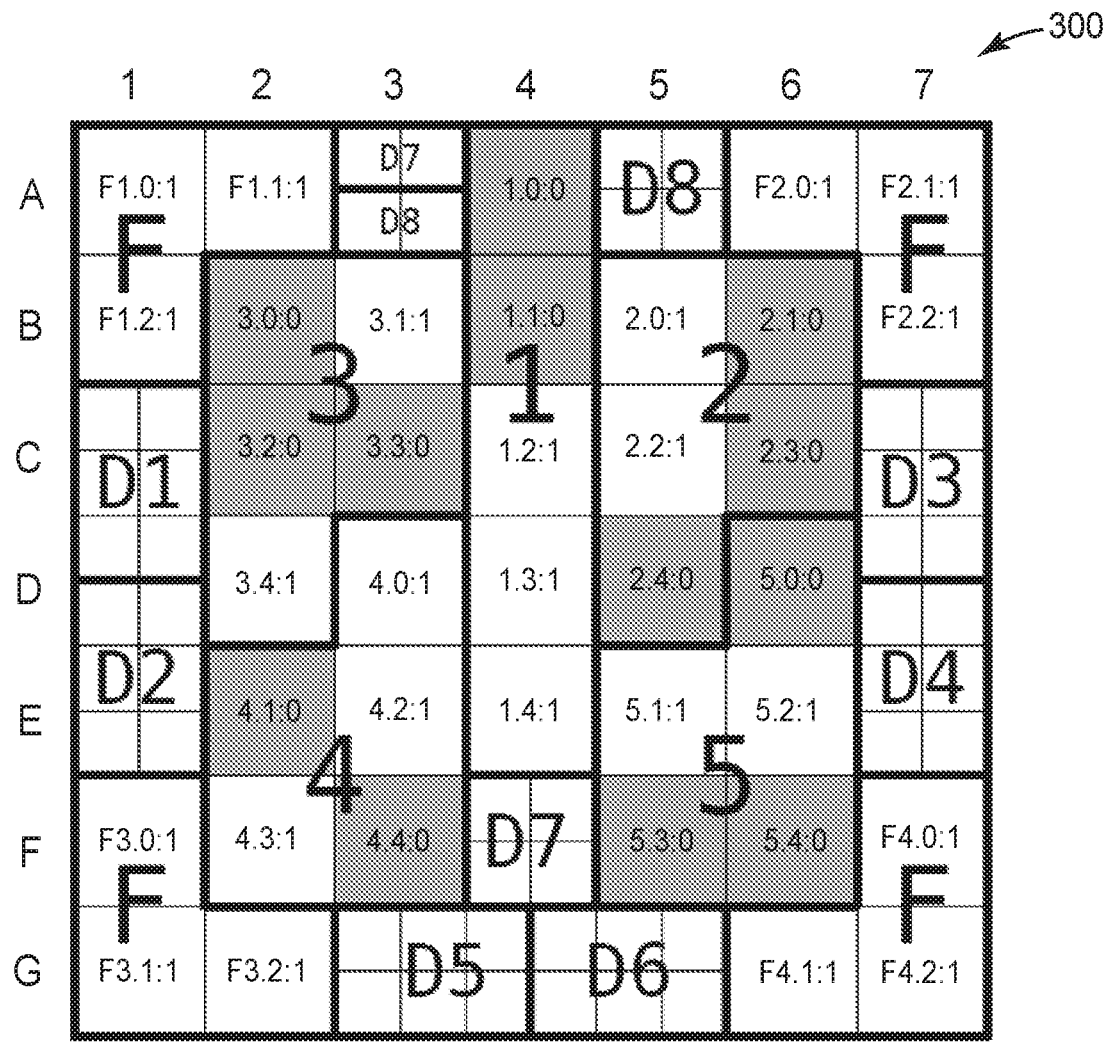
FIG. 3B is an example of a machine-readable optical code with a data payload.

FIG. 3B is an example of a machine-readable optical code with a data payload. FIG. 3B has the same arrangement of finder, content and context optical elements as shown in FIG. 3A, but FIG. 3B additionally illustrates the numeric representation or bit state of each optical element (excluding content optical elements). For example, all twelve of the finder optical elements (A1, A2, A6, A7, B1, B7, F1, F7, G1, G2, G6 and G7) have a bit state of "1" (and are accordingly shown as white in FIG. 3B). The optical code in FIG. 3B is designed to be placed on an octagonal stop sign with a layer of reflective sheeting. The optical code can be formed by printing black infrared ink or putting another blackening material or substance over the retroreflective substrate of the stop sign in areas where bits are "0" or black, and around the boundary of the optical code so that the finder optical elements create a sharp contrast with the black background around the code when an image of the code is captured.

Because the optical code in FIG. 3B is designed to be applied to a stop sign, the context optical elements are written to provide classification information for a stop sign. For purposes of illustration, in an exemplary classification system, a stop sign is a "Class 28" sign, and to indicate that, the bits of context block 1 are set to read the number "28" (or "11100" in binary). Accordingly, the bits in context optical element block 1 are:

optical element 1.0: bit 0,
optical element 1.1: bit 0,
optical element 1.2: bit 1,
optical element 1.3: bit 1, and
optical element 1.4: bit 1.

The remainder of the context blocks 2-5 are encoded with Reed-Solomon error correction data. The error correction data is based on an application of an error correction function to a raw message that is encoded into an encoded message. While Reed-Solomon error correction and algorithms are used for exemplary purposes, other algorithms and error correction techniques will be apparent to one of skill in the art upon reading the present disclosure.

Figure 3C:
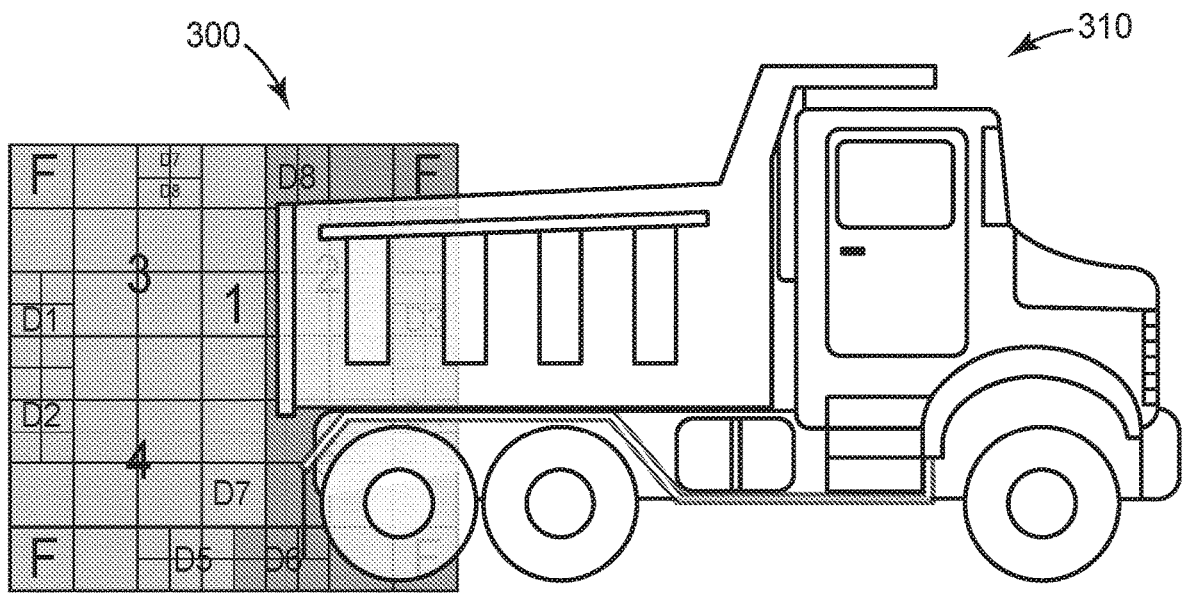
FIG. 3C is an example of the machine-readable optical code of FIG. 3A with a partially unrecoverable occlusion from the right.

FIG. 3C is an example of the machine-readable optical code 300 of FIG. 3A with an occlusion from the right (truck 310). In the example shown, a large portion of code 300 is occluded, including the top right and bottom right finder optical element blocks, the context optical element blocks 2 and 5, and content optical element blocks D3, D4, D6 and D8. In this example, no content information is considered readable because of the number of content optical elements that are occluded exceeds the number of content optical elements that can be occluded before reconstruction of the information encoded in the content optical elements is no longer possible. However, the context optical elements can be decoded because only two of the context optical elements (2 and 5) are occluded.

Figure 3D:
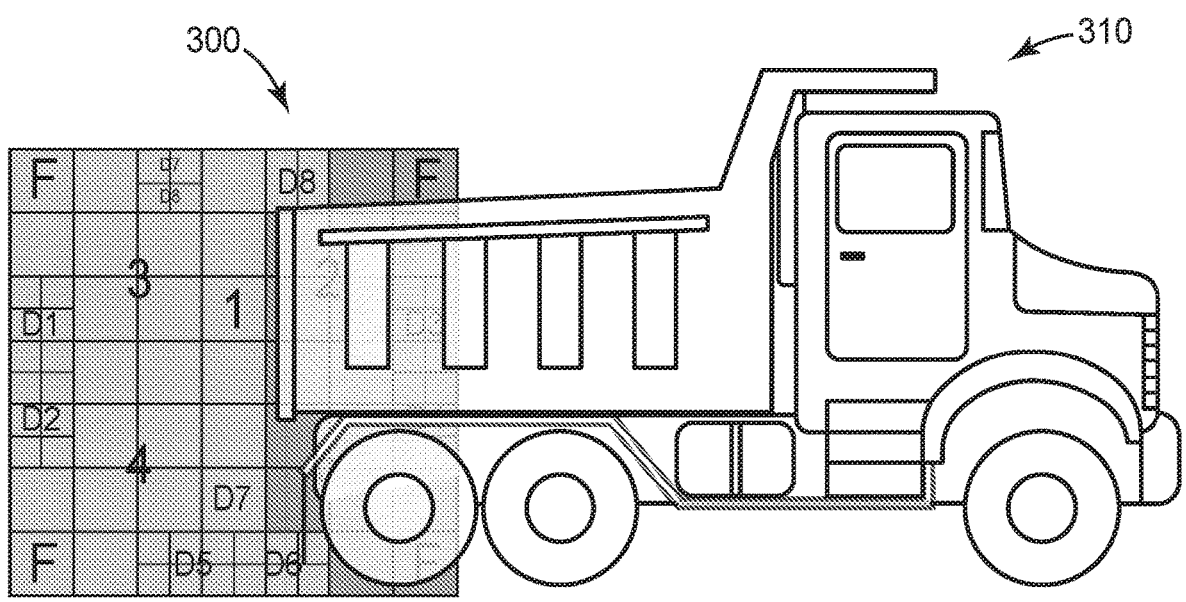
FIG. 3D is an example of the machine-readable optical code of FIG. 3A with a recoverable occlusion from the right.

FIG. 3D is an example of the machine-readable optical code 300 of FIG. 3A with an occlusion from the right in the form of truck 310. In the example shown, a portion of code 300 has been occluded, including all of context optical element blocks 2 and 5, the upper and lower right finder optical element blocks, and content optical element blocks D3 and D4. Because only two context optical element blocks (2 and 5) and only two content optical element blocks (D3 and D4) were occluded, both the context data (5 bits) and the content data (24 bits can be decoded).

Figure 3E:
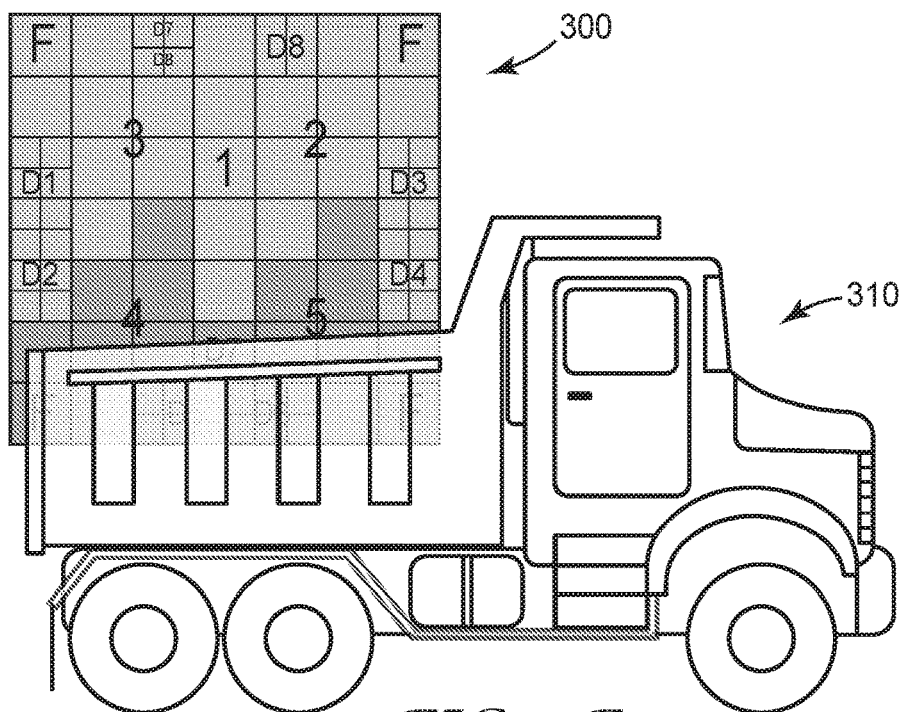
FIG. 3E is an example of the machine-readable optical code of FIG. 3A with a partially unrecoverable occlusion from the bottom.

FIG. 3E is an example of the machine-readable optical code 300 of FIG. 3A with an occlusion at the bottom of optical code 300 in the form of truck 310. In the example shown, a portion of the bottom of code 300 is occluded. Finder optical elements in both bottom corners are occluded, context optical element blocks 4 and 5 are occluded and content optical element blocks D5, D6 and D7 are occluded. The context data is recoverable, allowing reliable decoding of the 5 context bits. However, the content data is compromised because code 300 only includes four content optical element blocks dedicated to error correction, which means that only two content optical element blocks can be recovered in the event of a compromised read. Because more than two content optical element blocks have been compromised, none of the content data can be reliably decoded.

Figure 3F:
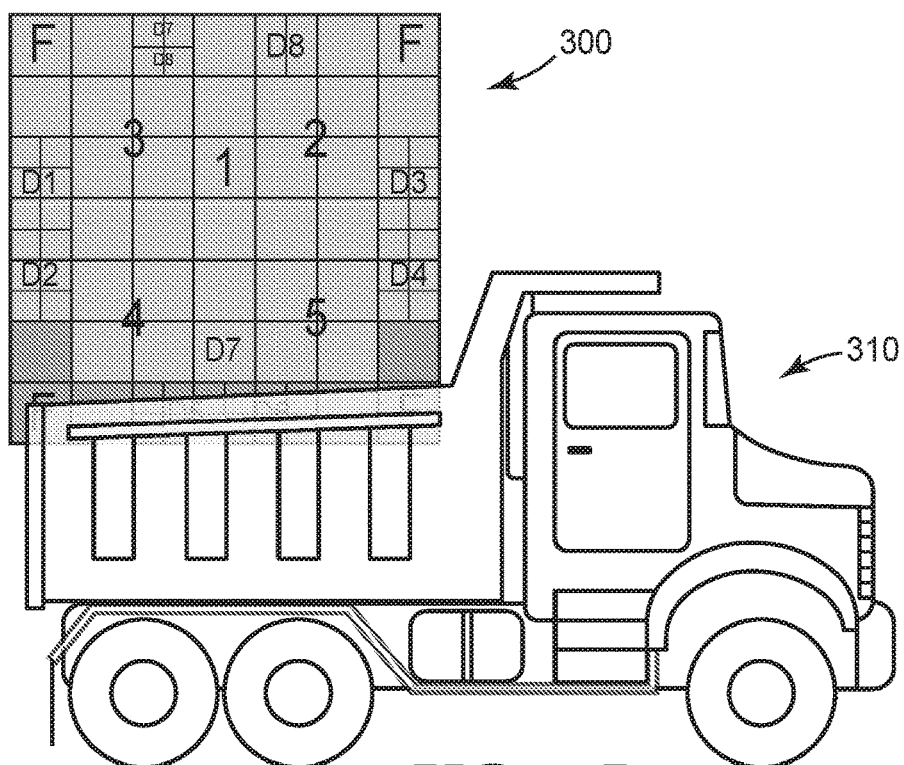
FIG. 3F is an example of the machine-readable optical code of FIG. 3A with a recoverable occlusion from the bottom.

FIG. 3F is an example of the machine-readable optical code of FIG. 3A with an occlusion at the bottom of optical code 200 in the form of truck 310. In this example, finder optical element blocks in both bottom corners are occluded. No context optical elements are occluded. And content optical element blocks D5 and D6 are occluded. Because no context optical element blocks are occluded, the content data can be reliably read or otherwise decoded. Because only two content optical element blocks are occluded, the content optical element data can be recovered through error correction, and all 24-bits of content data can also be reliably read or decoded.

While the images in 3A-3F show a variety of occlusion scenarios and explain the recoverability of occluded data in those scenarios, the limits on recovering data are exemplary based on Reed-Solomon encoding techniques. Other encoding techniques or algorithms may lead to other results with respect to recoverability of data.

Figure 4:
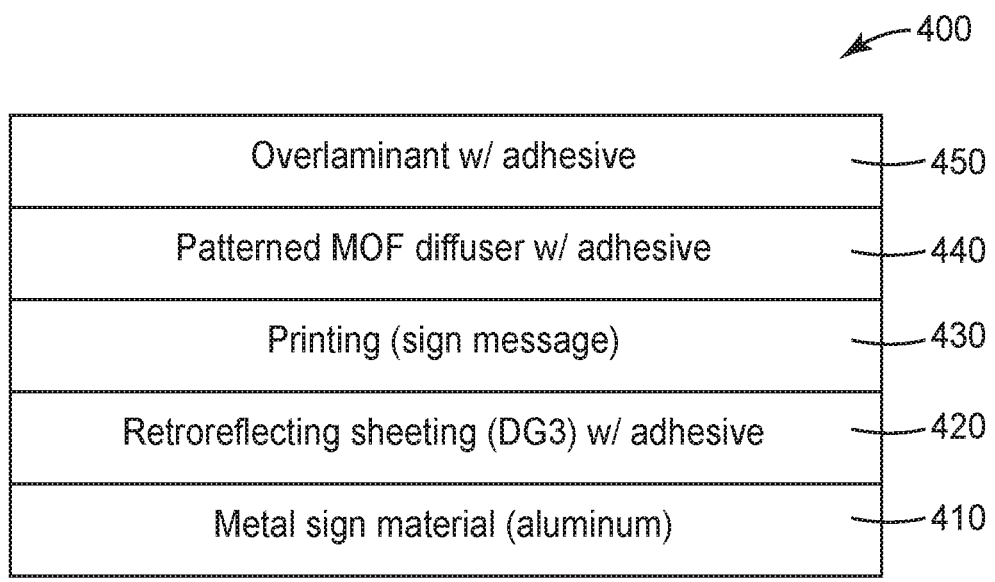
FIG. 4 is an exemplary sign construction consistent with the present disclosure.

FIG. 4 illustrates an exemplary sign construction 400 consistent with the present disclosure. While an optical code consistent with the present disclosure can be applied to any article, whether mobile or stationary, FIG. 4 illustrates an embodiment wherein an optical code is applied to a sign with retroreflective sheeting embodied thereon. FIG. 4 illustrates a cross section of such a sign with multiple layers, retroreflective sheeting and an optical code as described herein. Layer 410 may be a substrate. Typically substrate 410 is a rigid or inflexible and durable material, such as a metal. One such suitable metal is aluminum. In other embodiments, substrate 410 may be or include any rigid, semi-rigid, or flexible physical surface.

Retroreflective sheet 420 may be a retroreflective sheet as described in this disclosure. A layer of adhesive (not shown) may be disposed between retroreflective sheet 420 and substrate 410 to adhere retroreflective sheet 420 to substrate 410. One example of retroreflective sheeting that may be used consistent with the present disclosure is 3M Diamond Grade™ DC Reflective Sheeting Series 4000, available from 3M Company of St. Paul, Minn.

Layer 430 includes a message or image, which is typically printed onto layer 420. Layer 430 may be a traffic sign image, such as the stop sign shown in FIGS. 1A-1D. Layer 430 may include any message or image in the visible light spectrum, or a message or image that visible at a wavelength other than the optical code in layer 440. Examples of including information or images visible at different wavelengths in a single sign, license plate, or other substrate, are described in more detail in U.S. Pat. No. 8,865,293, which is expressly incorporated by reference herein in its entirety.

Layer 440 includes an optical code consistent with the present disclosure, such as the optical codes shown in FIGS. 2A-3F. An optical code in layer 440 may be formed in a variety of ways. For example, if optical code 440 is designed to be visible in the visible light spectrum, it can be printed with a dark color (such as black) onto a light (or white) substrate. If an optical code in layer 440 is designed to be visible in the IR spectrum (typically in the range of 700-1000 nm, though in some instances, a wave length such as 850 nm or 900 nm may be used), optical code in layer 440 could be created in a variety of ways. Specifically, with retroreflective layer 420 beneath layer 440, any portion of layer 420 that is not covered with a material or substance that absorbs, scatters, or otherwise inhibits retroreflection in the infrared spectrum will appear white or light. Thus, applying a material that absorbs, scatters or otherwise kills retroreflection in the infrared spectrum can be used to create black optical elements and a boundary around an optical code in layer 440.

Examples of materials that may be used include printing portions of the sign desired to be black or dark using an IR-absorbing black ink. In another instance, an IR absorbing multi-layer optical film (MOF) can be selectively cut such that any portions of the sign desired to be white are removed, and the film is overlaid on layer 430. When viewed in the infrared spectrum, the film will only allow retroreflection in the areas of the optical code that are intended to be white. While the infrared (IR) spectrum is discussed herein, other spectrums can be used, such as the near infrared spectrum (light with wavelengths of approximately 950 nm). When the optical code in layer 440 is created 950 nm light absorbing film, when light at 950 nm illuminates the optical code, the black printed sections will absorb the light and appear black to the machine vision system, and the unprinted sections will appear bright or white.

Sign 400 may optionally include an overlaminate 440 that it is formed or adhered over layer 440. Overlaminate 450 may be constructed of a visibly-transparent, infrared transparent material, such as but not limited to multilayer optical film.

The use of a retroreflective layer in the construction of sign 400 can provide several advantages. For example, when information is captured primarily in the infrared spectrum, and the only visible areas in an image are the bright or white optical elements created by the light reflecting from retroreflective sheeting 420, the lighting conditions returned to the camera may create difficulty for the image capture device and/or computing device to identify any objects that are not IR retroreflective in an image. This includes the background around a sign or an optical code, and other personal information, such as an individual's face, image, or other identifying information.

Further, retroreflected light from layer 440 that generates the white or bright portions of an optical code may result in an image with a stark contrast between black areas in an image, including a natural boundary or transition between an optical code and the surrounding image. In some existing QR codes, black optical elements may be necessary around the entire or a part of a boundary of the code to delineate for a machine vision system where the QR code begins and ends. In contrast, because the area surrounding an optical code on sign 400 will appear black in the IR spectrum, no additional boundary optical elements are required, allowing greater encoding efficiency.

Figure 5:
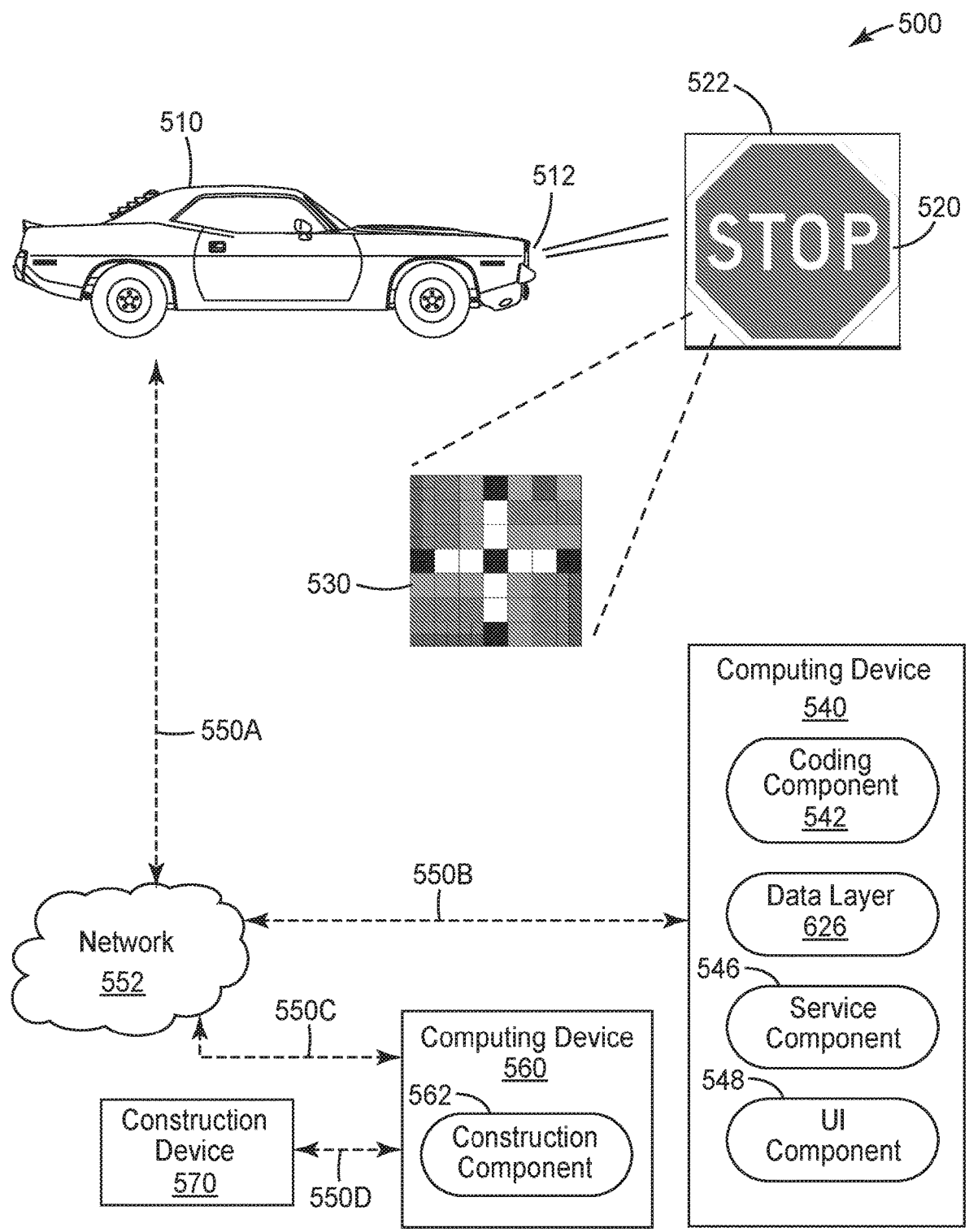
FIG. 5 is an example of a system for reading a multi-dimensional machine-readable optical code.

FIG. 5 is an example of a system for reading a multi-dimensional machine-readable optical code. System 500 includes sign 520. Sign face 522 includes an image that can be seen in the visible light spectrum, stop image 522, and a machine-readable optical code 530, which may be visible in the visible light spectrum outside of the visible light spectrum. Sign 500 has a substrate, and may also include a layer of retroreflective sheeting behind the optical code 530.

Optical code 530 includes a plurality of finder optical elements arranged in a pattern and detectable by a machine vision system 512 mounted on vehicle 510 from a first distance. Optical code 530 also includes a plurality of context optical elements representing context information, wherein the context optical elements are detectable by a machine vision system from a first distance. The optical code 530 also includes a plurality of content optical elements representing content information, wherein the content optical elements are not detectable by a machine vision system at a first distance, but are detectable by a machine vision system from a second distance, and the second distance is lesser than the first distance.

As vehicle 510 approaches sign 520, machine vision system 512 detects and processes the machine-readable optical code. While machine vision system 512 is shown as mobile and mounted to vehicle 510 in FIG. 5, machine vision system may be stationary or may be mounted to other equipment or devices. Machine vision system 512 may be an infrared camera, including an image sensor and a light source. In some instances, a machine vision system will include a filter to increase the sensitivity of the image sensor to the IR spectrum. Other types of machine vision systems will be apparent to one of skill in the art upon reading the present disclosure.

Machine vision system 512 can include computing device 540 such that it is directly connected with computing device 540 via a wired or wireless connection that does not require a network. In other instances, machine vision system 512 can be communicatively coupled with computing device 540, using one or more communication links 550A, 550B. Although computing device 540 is illustrated as connected to vehicle 510 by network 552, in other examples computing device 540 may be included directly within or at vehicle 510 and communicate with vehicle components through direct communication or an internal network of the vehicle.

Machine vision system 512 may send images of optical codes to computing device 540. Communication links 550A and 550B may represent wired or wireless connections. For instance communication links 550A and 550B may be wireless Ethernet connections using a WiFi protocol and/or may be wired Ethernet connections using Category 5 or Category 6 cable. Any suitable communication links are possible. In some examples, machine vision system 512 is communicatively coupled to computing device 540 by a network 552. Network 552 may represent any number of one or more network connected devices including by not limited to routers, switches, hubs, and interconnecting communication links that provide for forwarding of packet and/or frame-based data. For instance, network 552 may represent the Internet, a service provider network, a customer network, or any other suitable network. In other examples, machine vision system 512 is communicatively coupled to computing device 540 by a direct connection, such as Universal Serial Bus (USB) link.

Computing device 540 represents any suitable computing system, which may be a single device with or remote from machine vision system 512, such as one or more desktop computers, laptop computers, mainframes, servers, cloud computing systems, etc. capable of sending and receiving information with machine vision system 512. In some examples, computing device 540 implements techniques of this disclosure.

In the example of FIG. 5, computing device 540 includes coding component 542, data layer 626, service component 546 and user interface (UI) component 548. Coding component 542 can detect the data encoded in optical code 530 by applying the required data encoding scheme or algorithm to the data on optical code 530. Coding component 542 may query data layer 626 to convert a detected binary code from optical code 530 to machine-readable information.

Service component 546 may provide any number of services, by performing one or more operations. For instance, service component 546, upon receiving data read from the optical code may generate one or more alerts, reports, or other communications that are sent to one or more other computing devices, including an auto-drive component on vehicle 510. Such alerts may include but are not limited to: emails, text messages, lists, phone calls, or any other suitable communications. In some examples, user interface (UI) component 548 may act as an intermediary between various components of computing device 540 to process and send input detected by input devices to other components, and generate output from other components that may be presented at one or more output devices. For instance, UI component 548 may generate one or more user interfaces for display, which may include data and/or graphical representations of alerts, reports, or other communications.

Components 542, 626, 546, and 548 may perform operations described herein using software, hardware, firmware, or a mixture of both hardware, software, and firmware residing in and executing on computing device 540 and/or at one or more other remote computing devices. In some examples, components 542, 626 and 546 may be implemented as hardware, software, and/or a combination of hardware and software. Computing device 540 may execute components 626, 546 and 548 with one or more processors. Computing device 540 may execute any of components 542, 626, 546 or 548 as or within a virtual machine executing on underlying hardware. Components 542, 626, 546, 548 may be implemented in various ways. For example, any of components 542, 626, 546 or 548 may be implemented as a downloadable or pre-installed application or "app." In another example, any of components 542, 626, 546 or 548 may be implemented as part of an operating system of computing device 540.

For example purposes in FIG. 5, machine vision system is illustrated as part of or mounted to vehicle 510. Vehicle 510 may be an automobile, motorcycle, airplane, water vessel, military equipment, bicycle, train, or any other transportation vehicle. In other examples, machine vision system 512 may be attached to, included or embedded in, or otherwise comprise: a document, clothing, wearable equipment, a building, stationary equipment, or any other object to name only a few examples.

Optical code 530 is shown as incorporated as a sign in FIG. 5, however optical code may be mounted on, attached to, included or embedded in: a document, clothing, wearable equipment, a building, stationary equipment, or any other object to name only a few examples.

In some examples, optical code 530, or an article optical code 530 is attached to may include reflective, non-reflective, and/or retroreflective sheet applied to a base surface. A visible message, such as but not limited to characters, images, and/or any other information, may be printed, formed, or otherwise embodied on optical code 530 article. The reflective, non-reflective, and/or retroreflective sheet may be applied to a base surface using one or more techniques and/or materials including but not limited to: mechanical bonding, thermal bonding, chemical bonding, or any other suitable technique for attaching retroreflective sheet to a base surface. A base surface may include any surface of an object (such as described above, e.g., an aluminum plate) to which the reflective, non-reflective, and/or retroreflective sheet may be attached. An article message may be printed, formed, or otherwise embodied on the sheeting using any one or more of an ink, a dye, a thermal transfer ribbon, a colorant, a pigment, and/or an adhesive coated film. In some examples, content is formed from or includes a multi-layer optical film, a material including an optically active pigment or dye, or an optically active pigment or dye.

To initially manufacture or otherwise create optical code 530, construction device 570 may be used in conjunction with computing device 560, which controls the operation of construction device 570. In some examples, construction device 570 may be any device that prints, disposes, or otherwise forms optical code 530 and/or sign 520. Examples of construction device 138 include but are not limited to a needle die, gravure printer, screen printer, thermal mass transfer printer, laser printer/engraver, laminator, flexographic printer, an ink jet printer, an infrared-ink printer. In some examples, optical code 530 may be enabled by the retroreflective sheeting or infrared absorbing or scattering film constructed by construction device 570, and a separate construction process or device, which is operated in some cases by a different operators or entities than computing device 560, may apply the article message to the sheeting and/or the sheeting to the base layer (e.g., aluminum plate).

Construction device 570 may be communicatively coupled to computing device 560 by communication link 550D. Computing device 560 may control the operation of construction device 570. For instance, computing device 560 may include one or more printing specifications. A printing specification may comprise data that defines properties (e.g., location, shape, size, pattern, composition or other spatial characteristics) of the visible sign face 522 and optical code 530. In some examples, the printing specification may be generated by a human operator or by a machine. In any case, construction component 562 may send data to construction device 570 that causes construction device 570 to print a visible image or message and an optical code in accordance with the printer specification.

In some examples, construction component 562 may determine one or more probable regions or areas of a sign that are likely to be visually occluded. Such regions or areas may be defined by a user, hard-coded, or determined by construction component 562 based on one or more images that include at least the potential visually occlusion or a representation of an occlusion. In some examples, construction component 562 may output a graphical user interface in which a user can specify different regions or areas of a particular sign that may be visually occluded. Based on determining the regions or areas that may be visually occluded, construction component 562 may configure the block shapes, sizes and/or locations on the article to improve the likelihood that, if the one or more regions or areas of potential visual occlusion are occluded, then the message encoded in the optical element sets will still be decodable by a computing device. As an example, if a region or area in the upper right-hand quadrant of an optical code is likely to be visually occluded, construction component 562 may position optical element sets representing a message in locations other than the upper right corner, but may still include error correction data in optical elements sets positioned in the region or area of the upper right-hand quadrant. Any number of other possible distributions of size, shape, and location of optical elements are possible based on known or probable areas of visual occlusion for the machine-readable code.

In some examples, to decode a message in the machine-readable code, coding component 542 may determine, based at least in part on optical element set location data that indicates respective pre-defined locations of respective optical elements sets within the image, an optical element set. That is, optical element set location data may indicate coordinates or other location values that are mapped to different optical element sets and/or individual optical elements. Coding component 542 may determine, based at least in part on optical element location data that indicates respective pre-defined locations of respective optical elements within the optical element set, respective gradient values for each of the respective optical elements. For instance, given a known mapping between a pre-defined location of an image and an optical element, coding component may measure or otherwise determine a gradient value for that pre-defined location (which in some examples may be a single point or a set of points that correspond to pixels). Coding component 542 may determine, based at least in part on mappings between gradient values and encoded values, at least a portion of the message. For instance, coding component 542 access one or more stored mappings between gradient values and encoded values, and based on the detected gradient values for optical elements, reconstruct a string of decoded values that represent a portion of the message.

Figure 6:
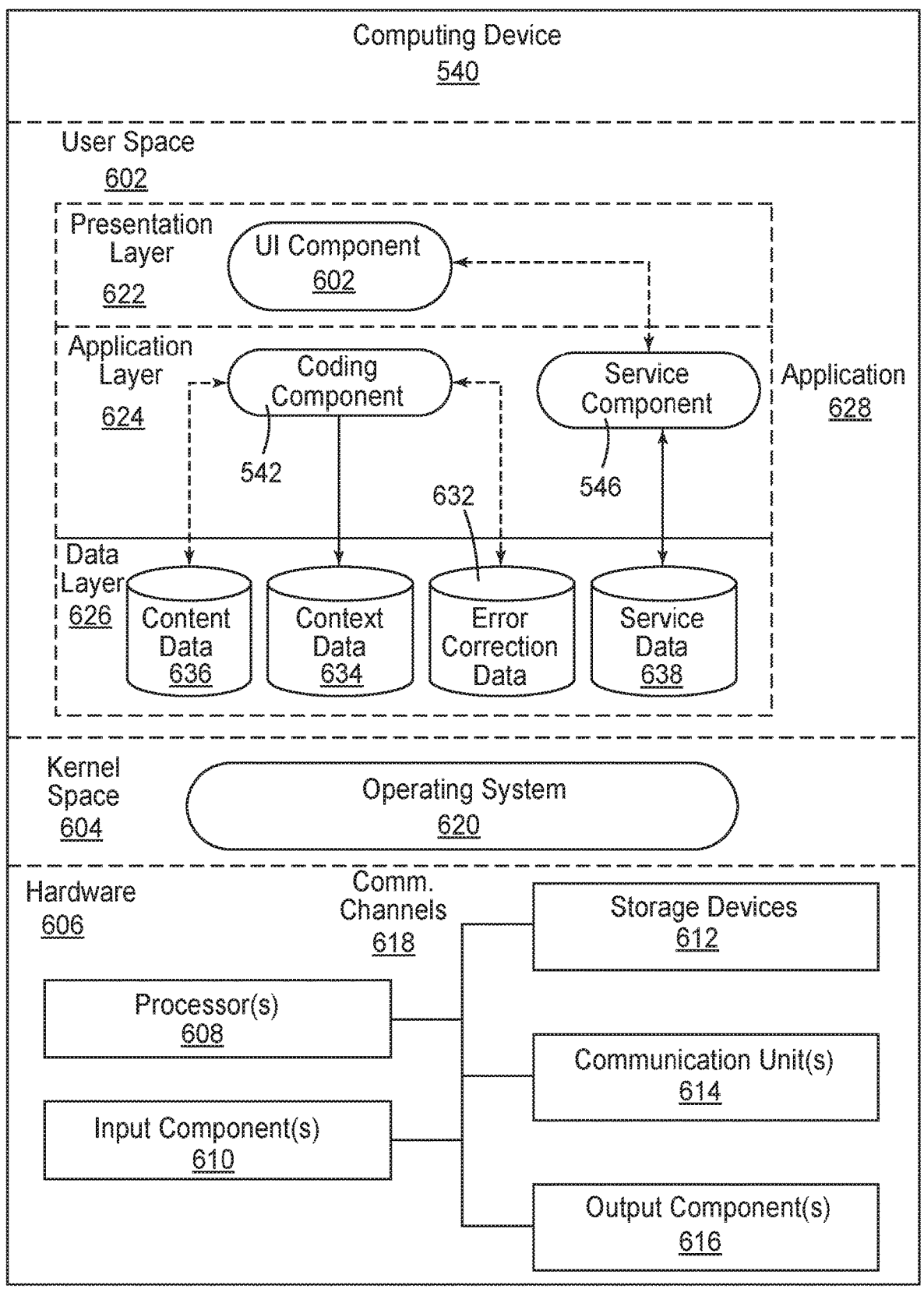
FIG. 6 is an example of a computing device for use in a system for reading a multi-dimensional machine-readable optical code.

FIG. 6 is an example of a computing device for use in a system for reading a multi-dimensional machine-readable optical code. FIG. 6 illustrates only one particular example of computing device 540, as shown in FIG. 5. Many other examples of computing device 540 may be used in other instances and may include a subset of the components included in example computing device 540 or may include additional components not shown example computing device 540 in FIG. 6. In some examples, computing device 540 may be a server, tablet computing device, smartphone, wrist- or head-worn computing device, laptop, desktop computing device, or any other computing device that may run a set, subset, or superset of functionality included in application 620.

As shown in the example of FIG. 6, computing device 540 may be logically divided into user space 602, kernel space 604, and hardware 606. Hardware 606 may include one or more hardware components that provide an operating environment for components executing in user space 602 and kernel space 604. User space 602 and kernel space 604 may represent different sections or segmentations of memory, where kernel space 604 provides higher privileges to processes and threads than user space 602. For instance, kernel space 604 may include operating system 620, which operates with higher privileges than components executing in user space 602.

As shown in FIG. 6, hardware 606 includes one or more processors 608, input components 610, storage devices 612, communication units 614, and output components 616. Processors 608, input components 610, storage devices 612, communication units 614, and output components 616 may each be interconnected by one or more communication channels 618. Communication channels 618 may interconnect each of the components 608, 610, 612, 614, and 616 for inter-component communications (physically, communicatively, and/or operatively). In some examples, communication channels 618 may include a hardware bus, a network connection, one or more inter-process communication data structures, or any other components for communicating data between hardware and/or software.

One or more processors 608 may implement functionality and/or execute instructions within computing device 540. For example, processors 608 on computing device 540 may receive and execute instructions stored by storage devices 612 that provide the functionality of components included in kernel space 604 and user space 602. These instructions executed by processors 608 may cause computing device 616 to store and/or modify information, within storage devices 612 during program execution. Processors 608 may execute instructions of components in kernel space 604 and user space 602 to perform one or more operations in accordance with techniques of this disclosure. That is, components included in user space 602 and kernel space 604 may be operable by processors 208 to perform various functions described herein.

One or more input components 642 of computing device 540 may receive input. Examples of input are tactile, audio, kinetic, and optical input, to name only a few examples. Input components 642 of computing device 616, in one example, include a mouse, keyboard, voice responsive system, video camera, buttons, control pad, microphone or any other type of device for detecting input from a human or machine. In some examples, input component 642 may be a presence-sensitive input component, which may include a presence-sensitive screen, touch-sensitive screen, etc.

One or more output components 616 of computing device 616 may generate output. Examples of output are tactile, audio, and video output. Output components 616 of computing device 540, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 616 may be integrated with computing device 540 in some examples. In other examples, output components 616 may be physically external to and separate from computing device 540, but may be operably coupled to computing device 540 via wired or wireless communication. An output component may be a built-in component of computing device 540 located within and physically connected to the external packaging of computing device 540 (e.g., a screen on a mobile phone). In another example, presence-sensitive display 602 may be an external component of computing device 540 located outside and physically separated from the packaging of computing device 540 (e.g., a monitor, a projector, etc. that shares a wired and/or wireless data path with a tablet computer).

One or more communication units 614 of computing device 540 may communicate with external devices by transmitting and/or receiving data. For example, computing device 540 may use communication units 614 to transmit and/or receive radio signals on a radio network such as a cellular radio network. In some examples, communication units 614 may transmit and/or receive satellite signals on a satellite network such as a Global Positioning System (GPS) network. Examples of communication units 614 include a network interface card (e.g. such as an Ethernet card), an optical transceiver, a radio frequency transceiver, a GPS receiver, or any other type of device that can send and/or receive information. Other examples of communication units 614 may include Bluetooth®, GPS, 3G, 4G, and Wi-Fi® radios found in mobile devices as well as Universal Serial Bus (USB) controllers and the like.

One or more storage devices 612 within computing device 540 may store information for processing during operation of computing device 540. In some examples, storage device 612 is a temporary memory, meaning that a primary purpose of storage device 612 is not long-term storage. Storage devices 612 on computing device 540 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 612, in some examples, also include one or more computer-readable storage media. Storage devices 612 may be configured to store larger amounts of information than volatile memory. Storage devices 612 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 602 and/or kernel space 604.

As shown in FIG. 6, application 628 executes in userspace 602 of computing device 540. Application 628 may be logically divided into presentation layer 622, application layer 624, and data layer 626. Presentation layer 622 may include user interface (UI) component 548, which generates and renders user interfaces of application 628. Application 228 may include, but is not limited to: UI component 548, algorithm coding component 542, data layer 626, and one or more service components 546. Presentation layer 622 may include UI component 548.

Data layer 626 may include one or more datastores. A datastore may store data in structure or unstructured form. Example datastores may be any one or more of a relational database management system, online analytical processing database, table, or any other suitable structure for storing data. Content datastore 634 may include: a series of bits consisting of the payload from content optical elements and the information associated with those series of bits. In some examples, content datastore 634 may include messages in encoded or decoded form. Context datastore 636 may include a series of bits consisting of the payload from context optical elements and the information associated with those series of bits. In some examples, context datastore 634 may include messages in encoded or decoded form. Error Correction Data 632 may include a series bits forming codewords constructed by the error correction algorithm which aids in reconstruction and verification of payload data found in the content optical elements and context optical elements. Service data 638 may include any data to provide and/or resulting from providing a service of service component 546. For instance, service data may include information about optically active articles (e.g., vehicle registration information), user information, or any other information.

Machine vision system 510 may capture an image, determine that an optical code 530 is present in the image using finder optical elements, and communicate it to computing device 540 through UI component 548 or communication channels 550A, and 550B. In response to receiving the image, coding component 542 may determine that a particular image region of the image represents an optical code. By applying one or more decoding techniques, such as a Reed-Solomon decoding or error detection technique, coding component 542 may determine, through communication with content datastore 636 and context datastore 634 that the optical code in the image represents a series of data indicating that a speed limit sign is ahead, and that the speed limit on the sign is 50 kilometers per hour.

Service component 546 may perform one or more operations based on the data generated by coding component 542, such as send data to UI component 548 that causes UI component 548 to generate an alert for display. In some examples, service component 546 may modify the operation of a vehicle. For instance, service component 546 may alter the velocity, acceleration, direction, suspension, brakes, or any other function of the vehicle. UI component 548 may send data to an output component of output components 616 that causes the output component to display the alert. While one particular implementation of a computing system is described herein, other configurations and embodiments of computing systems consistent with and within the scope of the present disclosure will be apparent to one of skill in the art upon reading the present disclosure.

In some examples, dynamic environments, such as work zones may provide more difficulty for autonomous or semi-autonomous vehicles. For instance, relying on enhanced maps and GPS may have limitations because hazards or workers may be dynamically relocated on minute-by-minute or hour-by-hour basis. Computing device 540, when implemented in a vehicle such as an autonomous, semi-autonomous or vision-assisted vehicle may provide real-time navigational markers with codes as described in this disclosure that allow such vehicles to reliably locate, people and devices and navigate through such areas, even if portions of the code are visually occluded by other objects or occlusions in the areas. In some examples, as described in this disclosure, codes are invisible to the human eye but are visible in specific wavelengths of light to commercially available machine sensors. These unique machine-readable codes that may be attached to the work zone devices, may provide precise object detection and rapid processing to enable autonomous, semi-autonomous, or vision-assisted navigation. As such, a vehicle that include a computing device and image capture device such as described in this disclosure may alter its operation in response to determining information encoded in one or more codes.

In some examples, machine-readable optical codes and systems for reading such codes in this disclosure are compatible with existing Manual on Uniform Traffic Control Devices (MUTCD) rules and/or with conventional work zone materials. In some examples, machine-readable optical codes of this disclosure may provide information for faster and/or more accurate detection and processing by vehicles than other modalities (e.g., GPS, maps, etc.) for navigating vehicles. In some examples, universal machine-readable optical codes may be standardized or constant for each particular type of article to which the code is embodied on. In some examples, distinct machine-readable codes may be used for different types of articles in particular work zones or other bounded regions or areas. In some examples, a machine-readable code may include a unique spatial configuration of optical elements and/or information encoded therein that represents a human or a worker. In some examples, localization data may be encoded in the machine-readable code, where such localization information indicates locality specific information about the article or surrounding area of the article, and in some examples, may not be available in GPS or maps because of the dynamically changing environment in which the code is located.

In addition to improving classification and data quality of signs, infrastructure articles may provide an opportunity to supplement location data provided by high definition mapping. Mapping companies are creating extremely detailed and dynamic maps to help drivers and automated vehicles plan routes and to position the vehicle appropriately on the roadways. Current high-definition (HD) mapping relies on continuous analysis of SIFT (Scale Invariant Feature Transform) features to provide localization. In order to develop reliable features, an data dense mapping may occur and be stored in an accessible way by the vehicle to reference. In some instances, this is both time consuming and expensive (both in economic and computation terms). In some instances it is also possible that the landmarks used as SIFT features will change, challenging the vehicle while it is attempting to perform its SLAM (Simultaneous Localization and Mapping).

Techniques of this disclosure may alleviate the computational expense by embedding information into signage which can give precise GPS information, as well as reduce the ambiguity or error-prone action of matching SIFT features with point cloud data.

Some optical codes may contain high precision GPS coordinates as well as a unique-to-the-sign identifier. Finder and timing modules on the optical code may allow for accurate read distance vector determination using planar pose estimation techniques. A computing device combining this distance vector and the decoded GPS coordinates specify a reference position to compare current GPS coordinates, providing and offset/drift/error correction and thus localization, even in an urban canyon (for example) where GPS data may be unreliable.

As an example, a vehicle machine vision system captures an image of a sign in infrared light exposing its embedded optical code. The finder module size and skew allows for normalization by a computing device of that image back to square. The size of the module may be measured by a number of pixels spread between two separated finder modules. This pixel count correlates to pixel size, which is proportionate to distance, allowing a vector determination by a computing device based on the amount of skewedness of the image, and the pixel size to tell a specific distance and direction to the sign. With a high precision GPS coordinate of the sign location, and the accurate projection of where the camera is, as long as the vehicle knows where the camera is located on the vehicle, a GPS location of the vehicle can now be determined by a computing device from the provided sign GPS and appropriate translation vector.

Using uniquely identified road signs or other articles for localization may be preferred over reliance on SIFT features because the sign may actively confirm the coordinate location and sign ID making it less likely that an incorrect or false match will occur. Point cloud data or scale invariant feature lists may not actually have any unique identifiers other than the shapes themselves. This often leaves the vehicle reasonably sure, but not certain it has chosen a set of points or feature to correlate to a specific place on the earth. Meaning, the vehicle probably was correct in its identification but could be incorrect and the vehicle will not know until it starts to now miss expected features as it has incorrectly localized. Techniques of this disclosure using optical codes for localization may provide improved confidence and/or certainty.

Using a sign or other article that has a unique id as well as high precision location may provide a confirmation or additional confidence information that the correct sign was identified and its location is verified. Even if a vehicle does not need to use the stored GPS coordinates of the sign, the vehicle can match the GPS coordinates to an expected SIFT feature. This may provide a positive ID to that SIFT feature, which may enable an increased level of trust in that association. In some examples, a security element may be introduced to certify a particular sign is the exact sign it says it is, and is not spoofed or otherwise invalid.

In some examples, optical codes may be used as a source of ground truth to train other systems or models. Example models may include neural networks, SVM classifiers, or any other supervised learning models. The data encoded in an optical code may be used as ground truth information to trans such models. As an example, data from the optical code, such as localization data, may be structured in a feature vector along with any other features and used to classify, for example, image data. An example classification may include classifying whether image data indicates a particular road sign. By including ground truth information in the feature vector that is applied to the model, the model may more accurately classifying the image data as including the particular road sign. Digitally certain data (e.g., optical code data with some ECC) used in conjunction with non-digitally certain data (e.g., poorly resolved image data) may improve classification of the non-digitally certain data. Although described in the context of classifying image data for a road sign, the techniques of using ground truth from an optical code may be more generally applied to any scenario of using digitally certain data to make a classifier for non-digitally certain data more accurate. Such techniques may provide an extra signal for the classifier, or operate as a check to validate that the result of classifier is correct.

In some examples, the machine-readable codes of this disclosure may be compatible with one or more sensors such as radar, Light Detection and Ranging (LIDAR), Near and Far Infrared, or any other suitable technologies. In some examples, one or more vehicles implementing techniques of this disclosure may exchange information decoded from the machine-readable codes of this disclosure using V2X or other suitable wireless technologies. In some examples, the machine-readable codes of this disclosure may be directly embodied on the article during article construction or may be later retrofitted with a decal or other layer that is later applied to an existing article.

Figure 7A:
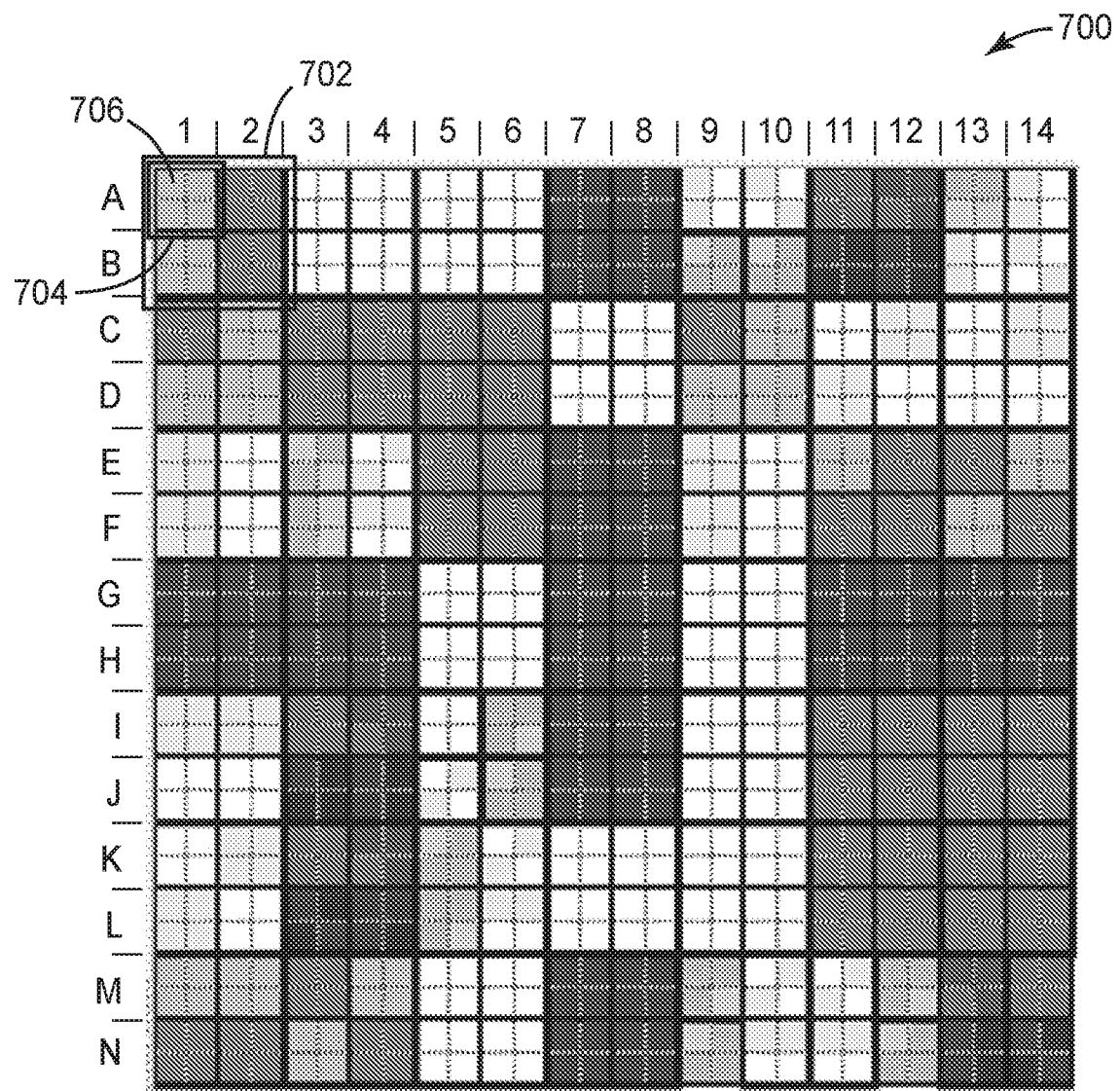
FIG. 7A is a machine-readable optical code with nested content optical elements.

FIG. 7A illustrates a machine-readable optical code 700 with nested content optical elements. In some examples, a nested or "child" optical element may be included within a parent optical element. For instance, a parent optical element set 702 may include includes at least one parent optical element 706, wherein the parent optical element 706 further includes a child optical element set (e.g., comprising four optical elements in cell [A, 1] of FIG. 7A), the child optical element set including a respective set of optical elements, such as child optical element 706.

In some examples, a first encoded value that corresponds to at least one optical element of a parent optical element is decodable at a particular distance between an image capture device and the article that is greater than or equal to a threshold distance. Child encoded values that correspond respectively to the set of optical elements in the child optical element set may not be decodable at the particular distance between the image capture device and the article. In some examples, the particular distance is a first distance, wherein the child encoded values that correspond respectively to the set of optical elements in the child optical element set are decodable at a second distance between the image capture device and the article, the second distance between less than the first distance. In some examples, the threshold distance is a distance at which a resolution of an image captured by the image capture device does not visually differentiate, above a differentiability threshold, between one or more optical elements of the child optical element set that are visually different. In some examples, the differentiability threshold may be user-defined, hard-coded, or machine-generated.

Nested content and context optical elements can be applied to any of the codes shown in the earlier figures. In some embodiments, an optical code may include both content and context optical elements. Nested content optical elements are a block of four content optical elements that can each be read individually as a bit of data, or can be read together as a single context optical element. From a first distance, optical code 700 appears as a 7×7 code, with rows A-B, C-D, E-F, G-H, I-J, K-L and M-N and columns 1-2, 3-4, 5-6, 7-8, 9-10, 11-12, and 13-14. Similar to the image shown in FIG. 2A, the optical elements in row G-H and column 7-8 are finder optical elements. The machine-readable optical code of FIG. 7A differs from FIG. 2A in that it shows the use of gradients within optical elements to allow nested content optical elements.

Figure 7B:
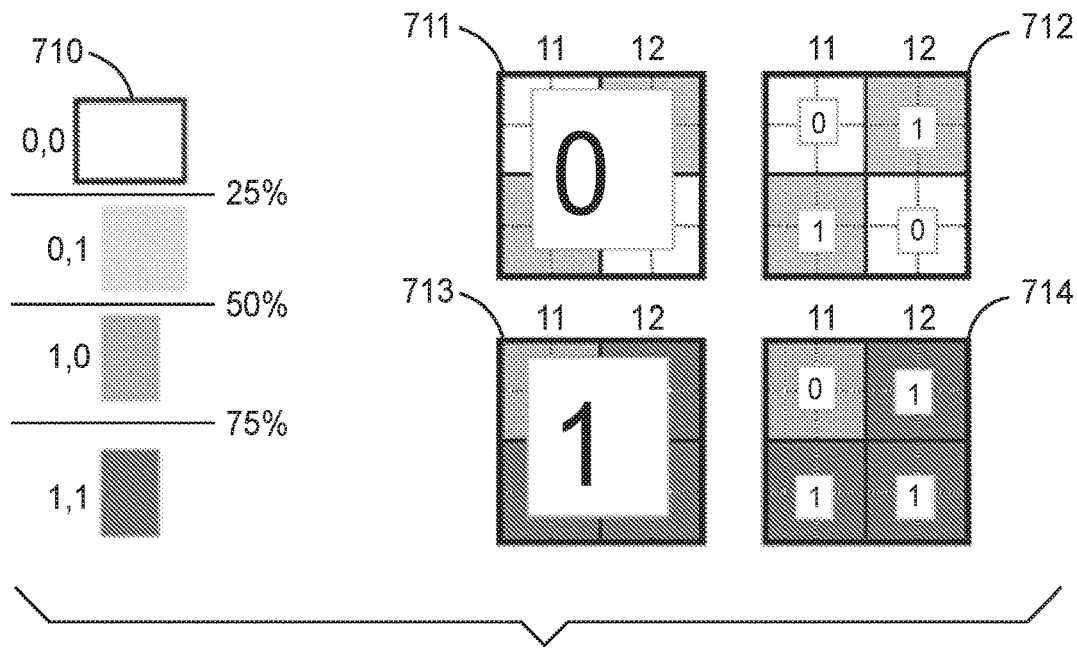
FIGS. 7B-7C illustrate sections of machine-readable optical codes with nested content optical elements.
Figure 7C:
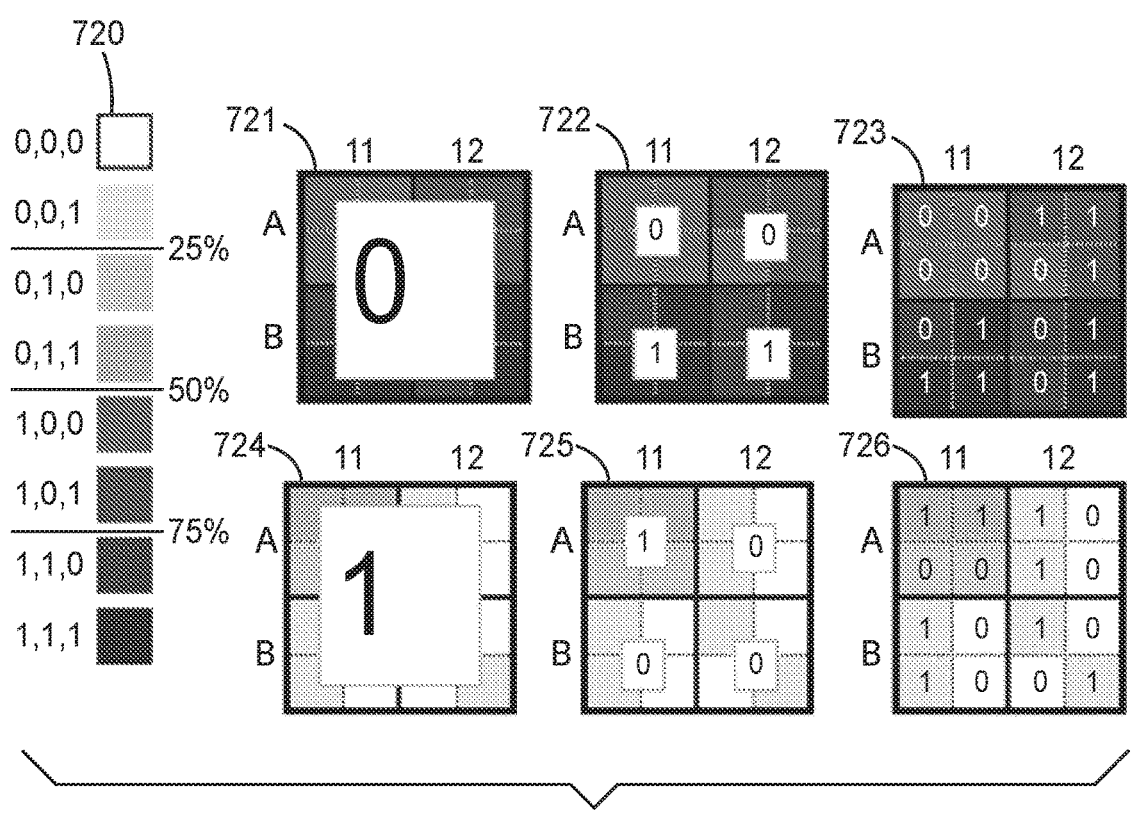

FIGS. 7B-7C illustrate sections of machine-readable optical codes with nested content optical elements. In many machine vision systems, the system determines whether an optical element is "white" or "black" by detecting the lightest tone in an image and the darkest tone in an image. The machine then "binarizes" the image by determining that anything that is darker than the tone that is half-way between the detected white and black is determined to be black. Anything that is lighter than the half-way (or 50%) tone is determined to be white. This same principle can be applied when multiple layers of content optical elements are nested.

One such example of a two-layer content optical element is shown in blocks comprising the intersection of columns 11-12, rows C-D. When creating code 700, block 711 comprised of intersecting columns 11-12, rows C-D are cumulatively decoded as a "0" when read together as a single block (as a context optical element). Because the machine vision system detects shade 0,0 shown in scale 710 as the lightest color in the region and shade 1,1 shown on scale 710 as the darkest color, in order for all of the blocks in optical element C-D, 11-12 to be read as a "0", the shade in each of the four blocks in 711 must be below the 50% line on scale 710.

To read or otherwise decode the information nested in each of the four content optical elements in block 711, a machine vision system can isolate block 711 and calibrate its binarizer to the shades only in block 711. Because the shades are below the 50% line of scale 710, the binarizer then determines that any region with a black level (e.g., based on luminance) below the 25% line is a "0", and anything above the 25% line is a "1". Therefore, even though the four blocks in 711 and 712 would be read as a "0" when read together as a single optical element, when read individually, as content optical elements, C11 and D12 are "0" while C12 and D11 are "1".

Similarly, block 713, when read from a first distance as a context optical element, needs to be read as a "1". To achieve this, only shades of black greater than the 50% line on scale 710 are used, such that when context optical element 713 is read from a first distance, the machine vision system determines that all four blocks are "dark" or "black" because they are above the 50% line on the gradient scale. When the content optical elements in block 714 are read individually, E11 is "0" and E12, F11, and F12 are "1", based on the machine vision system looking only at the gradient range above the 50% line when reading block 714 in isolation.

Blocks or optical elements 721-726 demonstrate an implementation using three levels of nested data. Block 721, when read from a first distance, is a "1" because all shades of black are greater than the 50% line on scale 420. However, when read from a second, nearer distance, (as shown on block 722) optical elements A11 and A12 are read as "0" because the shades within each of these optical elements is below the 75% line, which has become the division point used to binarize block 722. Optical elements B11 and B12 are read as 1. When block 723 is read from a third (and closest distance), a machine vision system is able to detect that each of optical elements A11, A12, B11 and B12 is made of four nested optical elements. In optical elements A11 and A12, the color spectrum ranges between 1,0,0 and 1,0,1 on scale 420, so the four nested optical elements in A11 are read as 0,0,0,0 and the four nest optical elements in A12 are read as 1,1,0,1.

Optical element 724 is encoded as a "0" when read as a single context optical element at a first distance, so all shades used within optical element 724 are below the 50% black-level line on scale 720. When block 725 is read as four separate content optical elements at a second distance, optical element A11 is a "1" and A12, B11 and B12 are each "0". Block 726 can be read at a third distance, nearer than either of the first or second distance, in which each content optical element mentioned with respect to block 725 can now be read as four separate content optical elements. The content optical elements in block A11 are 1,1,0,0. The content optical elements in block A12 are 1,0,1,0. The content optical elements in block B11 are 1,0,1,0 and the content optical elements in block B12 are 1,0,0,1. Although 50% black-level line is provided as one example, any value between 100-1% are possible.

While the present disclosure specifically describes two-level nesting, and three-level nesting, any desired level of nesting can be achieved based on the limitations of the image capture and processing technology. For example, to implement a code with five-level nesting, the gradient scale will need to be divided into $2^5$, or 32 gradients of color (or gray).

Figure 8:
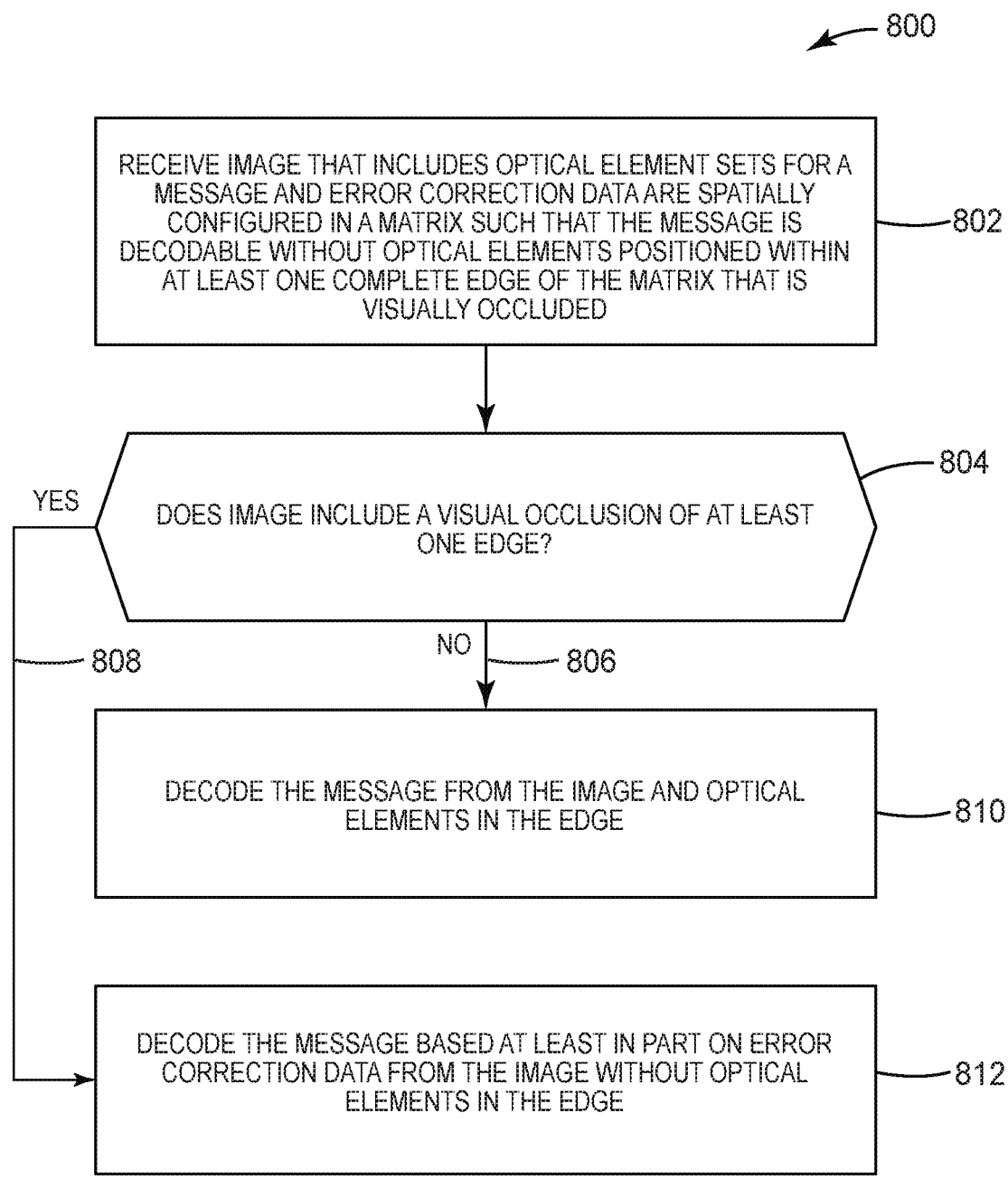
FIG. 8 illustrates a flow diagram including example operations performed by a computing device, in accordance with one or more techniques of this disclosure.

FIG. 8 illustrates a flow diagram 800 including example operations performed by a computing device, in accordance with one or more techniques of this disclosure. For purposes of illustration only, the example operations are described below as being performed by computing device 540 in FIGS. 5 and 6. Some techniques of FIG. 8 may be performed by one or more image capture devices, computing devices or other hardware. In FIG. 8, computing device 540 receive an image of one or more optical element sets included in a machine-readable code as described in this disclosure (802). The image is captured by an image capturing device such as a camera.

Computing device 540 may determine whether the image includes a visual occlusion (804). In some examples computing device 540 may determine whether the visual occlusion occurs in at least one edge of a matrix that represents the machine-readable code. If the visual occlusion does not occur in at least one edge of a matrix that represents the machine-readable code (806), or no visual occlusion is present, computing device 540 may decode the message represented by the machine-readable code based least in part on one or more optical elements from the at least one edge (810). In some examples, computing device 540 may decode the message without using error correction data included within the machine-readable code. If the visual occlusion does occur in at least one edge of a matrix that represents the machine-readable code (808), computing device 540 may decode the message based at least in part on error correction data from the image and without using optical elements in the visually occluded edge (812).

Figure 9:
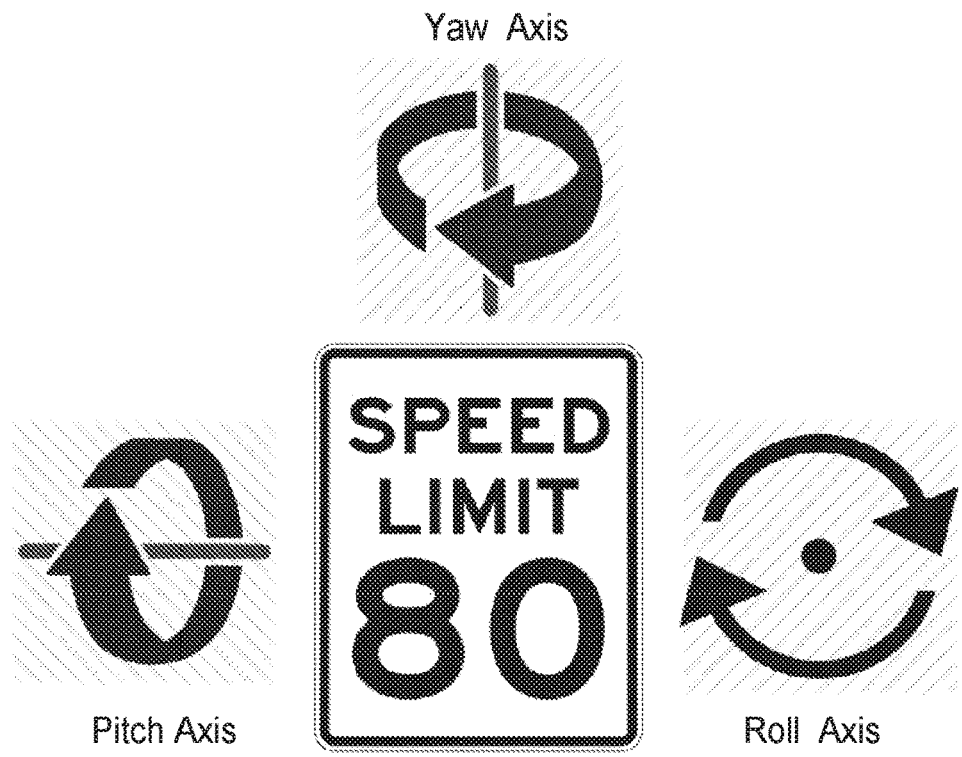
FIG. 9 illustrates a retroreflective article and example yaw, pitch, and roll axes, in accordance with techniques of this disclosure.

FIG. 9 illustrates a retroreflective article and example yaw, pitch, and roll axes, in accordance with techniques of this disclosure. In some example, the retroreflective article (e.g., a speed limit sign) may include an optical code in accordance with techniques of this disclosure. In some examples, an optical code of this disclosure may be used for infrastructure identification and context communication, such as in roadway applications. In some examples, the optical code may account for slight rotation of the two-dimensional barcode in which it is placed on in the context of pose normalization. Occlusion robustness may therefore be an advantage or benefit of implementing such optical codes in infrastructure applications among other possible implementations. In some examples, an optical code allows for variable bit payload, mapped to a predetermined message In some examples, optical codes of this disclosure are differentiated from many other block matrix codes by including a number of optimizations which may provide advantages in roadway infrastructure. The optical codes of this disclosure may optimize between accurate detection, read distance, and error recovery from common mechanisms of code destruction.

Due to the environment of infrastructure, signs and infrastructure materials have a specific set of common occlusions and deformations. Optical codes of this disclosure may optimize or improve error correction and data layout for these types of occlusions. The optical code may recover data from edge occlusions more than other occlusion styles. Edge occlusions may be prevalent in typical infrastructure driving scenarios.

In some examples, to increase the read distance of optical codes of this disclosure, these optical codes may have a lower number of modules dedicated to code finding and pose estimation. The specifics of this finder are discussed further in this disclosure.

In some examples, optical codes of this disclosure may have no meta data information and in certain instances no quiet zone. This differentiates optical codes from other popular codes such as Data Matrix and QR codes. This reduction in meta data modules may allow optical codes of this disclosure to be more space efficient with data transmission. In an instance of a sign where the physical code dimensions are bounded by the size of the sign, space efficiency may be important. A reduction in the number of required modules means that data can be either be decoded from further away because the code can be larger or that more error correction can be placed on a similar size code.

In some examples, optical codes of this disclosure take advantage of the typical assumed orientation of a piece of infrastructure. FIG. 9 illustrates the axes for a sign although any article may be used. In some examples, a vehicle will encounter a sign with an optical code that has as a maximum, a small amount of roll rotation, a small amount of pitch rotation, and potentially significant yaw rotation.

In some examples, various terms may be referenced, such as the following.

In some examples, an "alignment pattern" may be a fixed reference pattern in defined positions in a matrix symbology, which enables decode software to resynchronize the coordinate mapping of the image modules in the event of moderate amounts of distortion of the image.

In some examples, a "blob" may be an extracted image contained within a quad.

In some examples, a "clocking edge" may refers to the edge of an optical code where the timing information is encoded.

In some examples, a "clocking pattern" may refer to timing or clocking modules.

In some examples, "contour extraction" may be a process of flattening a curved or contoured surface and resolving it into a 2 dimensional-flat-image, while working to maintain a proper or valid module/code perspective with as little distortion as possible or distortion below a threshold level of distortion.

In some examples, "encoding region" may be a region of a symbol not occupied by overhead patterns and available for encoding of data and error correction codewords. In some implementations, an encoding region could include version and format information.

In some examples, "finder pattern" may be a pattern of modules used to identify/recognize the presence of an optical code symbol. On multi-resolution codes, the finder and clocking pattern may be made from the largest modules.

In some examples, "fixed pattern" may be parts, portions or sections of the optical code symbol that are fixed in position. This includes the finder pattern, timing pattern and nearby quiet zone modules.

In some examples, "kernel size" may be a size of a sample window defined in terms of number of pixels or other measurement. This kernel may be utilized for performing the mathematical morphology operations.

In some examples, "module clearance" may refer to space around the code. Module clearance may define a required quiet zone where no code can be present. In some signage implementations (dark on light), the module clearance may be a space of bright pixels.

In some examples, "morphological open" dilation of the erosion of a set A by a structuring element B, $A \circ B = (A \ominus B) \oplus B$ where $\ominus$ and $\oplus$ denote erosion and dilation, respectively. Opening may remove small objects from the foreground (usually taken as the bright pixels) of an image, placing them in the background.

In some examples, "morphological close" is the closing of a set (binary image) A by a structuring element B is the erosion of the dilation of that set, $A \cdot B = (A \ominus B) \oplus B$ where $\ominus$ and $\oplus$ denote the dilation and erosion, respectively. Closing may remove small holes in the foreground, changing small islands of background into foreground.

In some examples, "multi-resolution" may mean optical code symbols with multiple module size classes within a single code, which may be different from single resolution optical codes.

In some examples, "occlusion" may mean an inability to read a section of a sign due to an obstruction. This may be partial or whole.

In some examples, "overhead patterns" may be overhead components of a symbol that include the finder patterns and timing patterns required for location and sizing characteristics of the symbol.

In some examples, "quad" may be four corners of a parallelogram defining a location of an optical code.

In some examples, "quiet zone" may be a buffer area used to separate an optical code from a background. A quiet zone size may be specified in number of modules of space required to construct a buffer or module clearance.

In some examples, "Ramer-Douglas-Peucker algorithm" may specify one or more operations to, given a curve composed of line segments (polyline), find a similar curve with fewer points. The algorithm defines 'dissimilar' based on the maximum distance between the original curve and the simplified curve. The simplified curve consists of a subset of the points that defined the original curve.

In some examples, "repetition bit" may be positioned or located bits that redundantly represent sections in blocks, thus allowing for occlusion recovery.

In some examples, "retroreflective" may refer to a surface or material designed to reflect an increased amount of light back at the source of the light with a minimal amount of scattering, and from a wide range of entrance angles.

In some examples, "single resolution" may refer to an implementation of an optical code with only one module size, which may be different from a multi-resolution optical code.

In some examples, "timing pattern" may be an alternating sequence of dark and light modules enabling module coordinates in the symbol to be determined.

Figure 10:
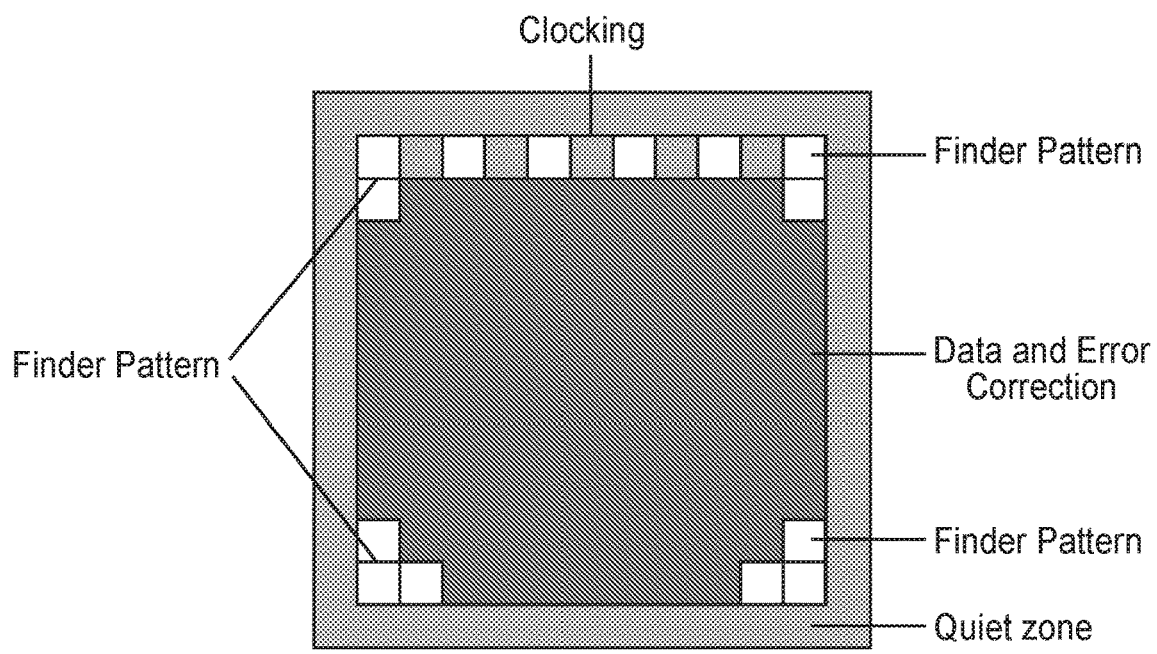
FIG. 10 illustrates an example structure of an optical code, in accordance with techniques of this disclosure.

In some examples, Mathematical symbols used in formulae and equations are defined after the formula or equation in which they appear. For the purposes of this document, the following mathematical operations apply:

$\circ$=morphological opening
$\cdot$=morphological closing
$\ominus$=dilation
$\oplus$=erosion FIG. 10 illustrates an example structure of an optical code, in accordance with techniques of this disclosure. For ease of reference, module positions are defined by their row and column coordinates in the symbol, in the form (i, j) where i designates the row (counting from the top downwards) and j the column (counting from left to right) in which the module is located, with counting commencing at 0. Module (0, 0) is therefore located at the upper left corner of the symbol. In some examples, in a multi-resolution optical code, there are more than one module size. The sizes may be sorted and referred to by module size. Thus, the largest module class may be labeled 1. Size 1 will have larger modules than size 2, which will have larger modules than size 3, and so on.

In some examples, version information is not encoded into the optical code; instead all finder templates are checked against the candidate image. In other examples version information may be encoded into the optical code.

In some examples, an optical code implemented in accordance with this disclosure may include the following characteristics:

a) Format:
1) Single resolution code with pre-determined balance of occlusion recovery capability and data capacity.
2) Multi resolution code with multiple layers of encoded information and a balance of occlusion recovery capability and data capacity for each layer.

b) Encodable data:
1) Single resolution: Numeric data only. The range of valid numbers may be from 1 to $2^{(\#data\ bits)}$.
2) Multi resolution code: Numeric data one each layer. The range of valid numbers may be from 1 to $2^{(\#data\ bits)}$ for that layer. In one implementation of a two-layer multi-resolution optical code, a first layer represents the MUTCD: Manual on Uniform Traffic Control Devices (Published by Federal Highway Administration) number for a US sign.

c) Representation of data:
A dark module is nominally a binary "zero" and a light module is nominally a binary "one". This representation can be inverted for certain applications.

d) Symbol size (not including quiet zone):
1) Single resolution code: At least 5 modules in width and 5 modules in height, although any numbers greater than 0 may be possible. In some examples, there is no upper bound on the code, but an example maximum size is 21 modules in height or width. In some examples a maximum size used for such dimensions may be any numbers greater than zero.
2) Multi resolution code: At least 7 modules in width and 7 modules in height as defined by the layer 1 modules, although any numbers greater than 0 may be possible. In some examples, there is no defined upper bound. In some examples a maximum size used for such dimensions may be any numbers greater than zero.

e) Code type: Matrix f) Orientation independence:
Yes. In some examples, an optical code has orientation independence. In other examples an optical code may be orientation dependent. In some examples, a fixed orientation can allow for certain advantages in code design and the decoding algorithm.

In some examples, optical codes may use reflectance reversal. Symbols may be intended to be read when marked so the image is either dark on light or light on dark. In some examples, a specification is based on dark images on a light background, but in cases where this is not true, then light modules may be taken as dark modules and dark modules as light modules. Some decoding techniques may not attempt to decode both standard codes and reflectance reversal codes; however, decoding both simultaneously may also be performed in other examples.

In some examples, repeated bits may be used with optical codes. For instance, to further increase the potential for occlusion recovery, optical codes can utilize repeated bits.

As shown in FIG. 10, optical codes may be rectangular matrices which consist of a set of square modules positioned or laid out according to rules dictated by code style and data payload.

Figure 11:
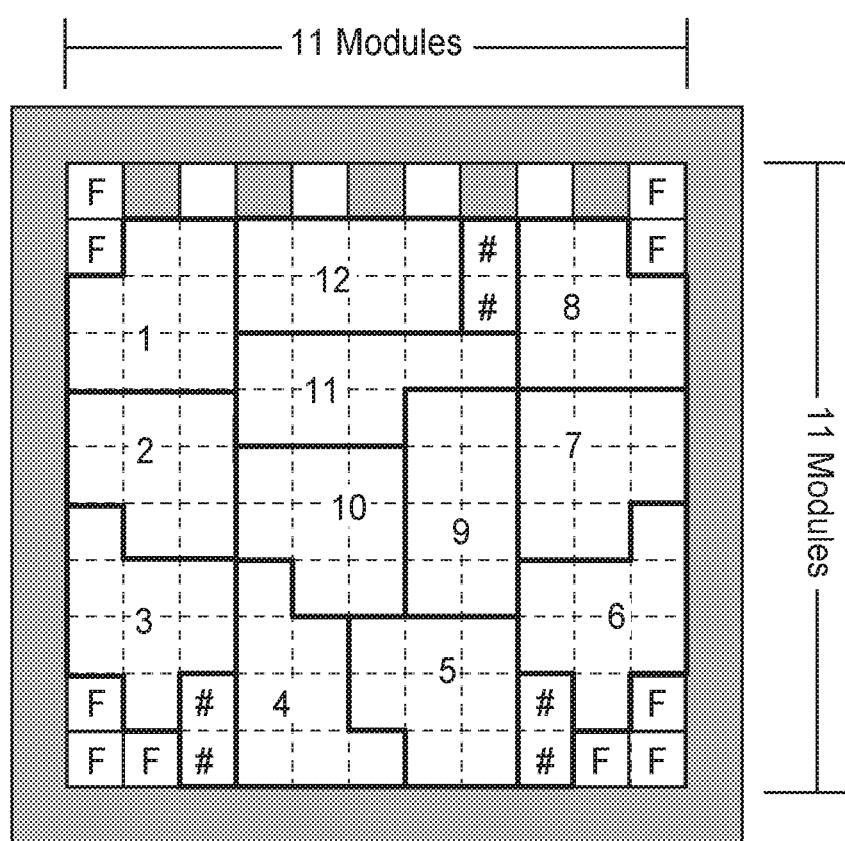
FIG. 11 illustrates a single-resolution optical code in accordance with techniques of this disclosure.

FIG. 11 illustrates a single-resolution optical code in accordance with techniques of this disclosure. A single resolution optical code may be at least 5 modules in width and 5 modules in height without including the quiet zone, although any numbers greater than 0 may be possible. In some examples, there is no absolute upper limit on the size of the code.

Figure 12:
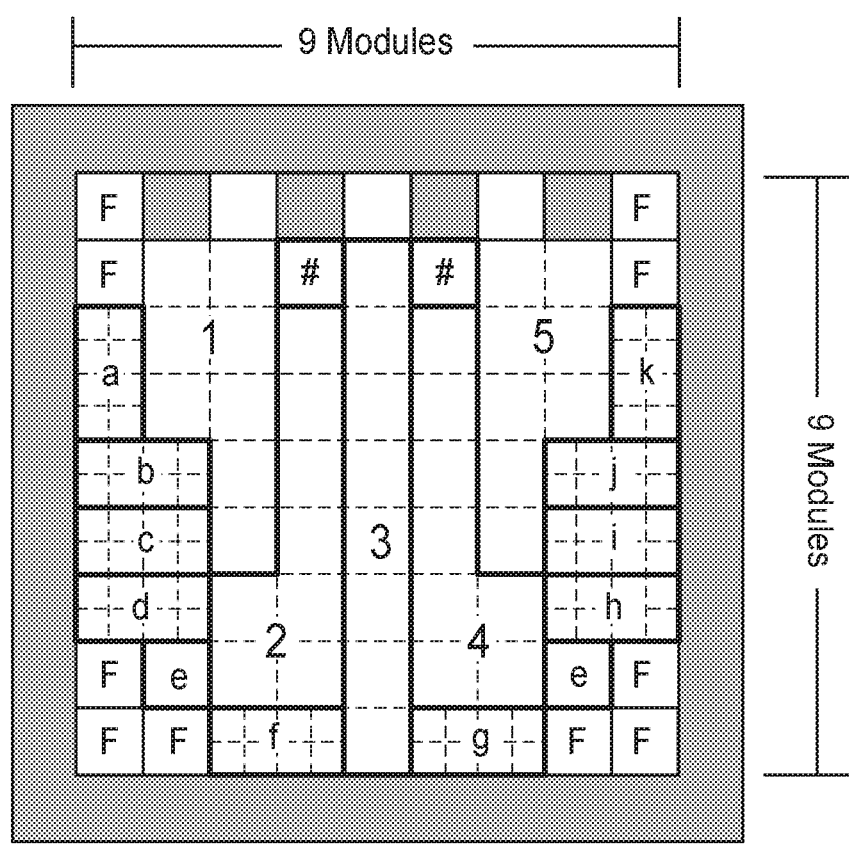
FIG. 12, illustrates a multi-resolution optical code in accordance with techniques of this disclosure.

FIG. 12, illustrates a multi-resolution optical code in accordance with techniques of this disclosure. A multi-resolution optical code may be made up of modules of various sizes. The modules may still be square in shape and may be created such that all modules of a certain resolution data payload are of the same size. In some examples, the reference modules for size are with respect to the largest module. In some example, the data payloads are sorted and referred to by module size. In some examples, data payload 1 may have larger modules than data payload 2 which will have larger modules than data payload 3 and so on.

In some examples, the minimum size for a multi resolution optical code is at least 7 modules in width and 7 modules in height, although any numbers greater than 0 may be possible. In some examples, there is no maximum size for a multi resolution optical code. In some examples, there is no maximum number of data payload. In some examples, codes may not be larger than 15 modules on a size and two data payloads are typically used.

FIG. 12 illustrates an example layout for a multi resolution code with two payloads. In FIG. 12, the largest modules and thus those can be read from the greatest distance are indicated by numbered blocks. The second resolution of modules are indicated by lower-case lettered blocks. While in this code both data payload 1 and data payload 2 are eight bits in size, this is not a necessary condition. The block size of each payload may be independent of the block size of another payload. In practice, data payload 1 block sizes may be equal to or smaller than any other data payload block size.

In some examples, a finder and clocking pattern for an optical code may be selected to minimize or reduce below a threshold the modules required to both find the code and normalize the object pose. In some examples, this finder and clocking pattern may be reduced in size to yield a greater percentage of the code space to data and error correction.

Figure 13:
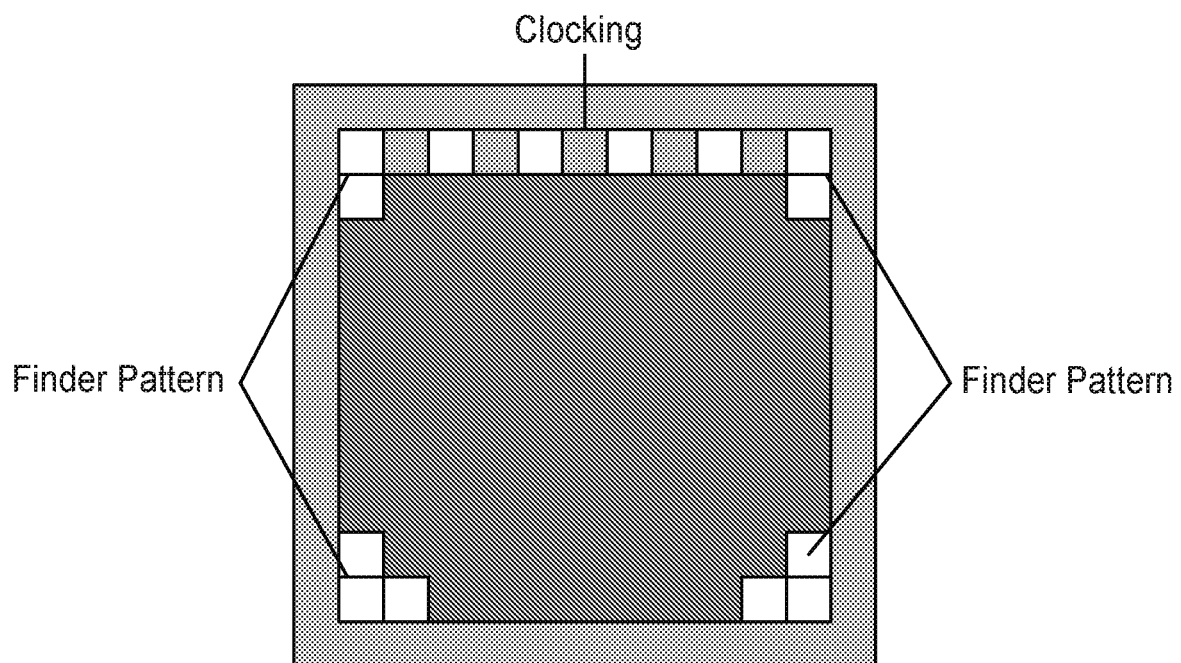
FIGS. 13-14 illustrate different clocking patterns, in accordance with techniques of this disclosure.
Figure 14:
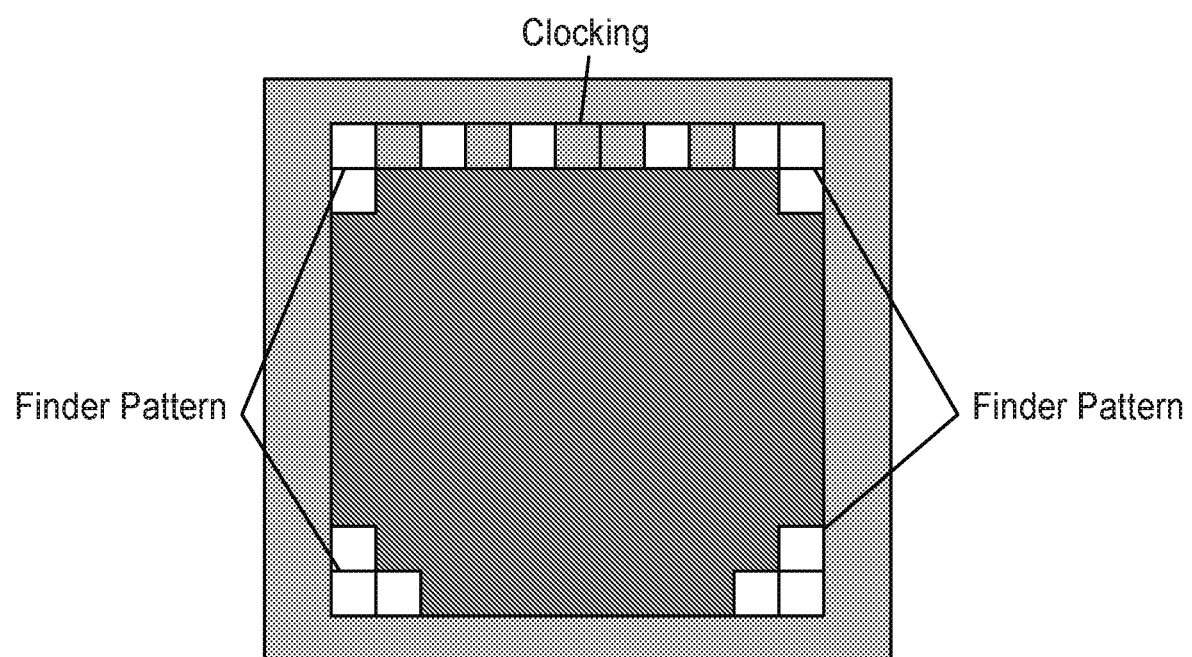

FIGS. 13 and 14 illustrate finder and clocking patterns for an optical code. The finder pattern corners of an optical code may or are always an opposite color of a quiet zone. The clocking pattern may be placed along a top edge and alternates between white and dark modules. An exception to this operation may be when a width of an optical code is even in the number of modules. In this case, the middle two modules are both the same color. In some examples, the finder and clocking pattern rules are applied for both single resolution and multi-resolution optical codes. On multi-resolution codes, the finder and clocking pattern may be made from the largest modules.

In some examples, a quiet zone must be free of all other markings on all four sides of an optical code. A width of the finder pattern may be at least 1 module, although any numbers greater than 0 may be possible. For multi-resolution codes, a width may be at least that of the largest module size included in the optical code. For an inverted code style, all modules of the code may be inverted including the quiet zone which becomes a bright band around the code and increases in width to at least 2 modules although any numbers greater than 0 may be possible.

When an optical code is affixed to a retroreflective article (e.g. a traffic sign) then the background may work as a sufficient finder pattern. In such examples, no additional finder pattern may be necessary. The optical code may be created with the finder and clocking pattern on the outer edge of the retroreflective article.

In some example a repeated bits pattern for an optical code may be implemented to minimize, or reduce below a threshold, the effect of occlusions by adding redundancy to blocks. In some examples, repeated bits may be positioned to enable a greater level of occlusions on specific blocks.

FIGS. 13-14 illustrate different clocking patterns, in accordance with techniques of this disclosure. FIG. 13 illustrates an even size clocking pattern. FIG. 14 illustrates an odd size clocking pattern.

Figure 15:
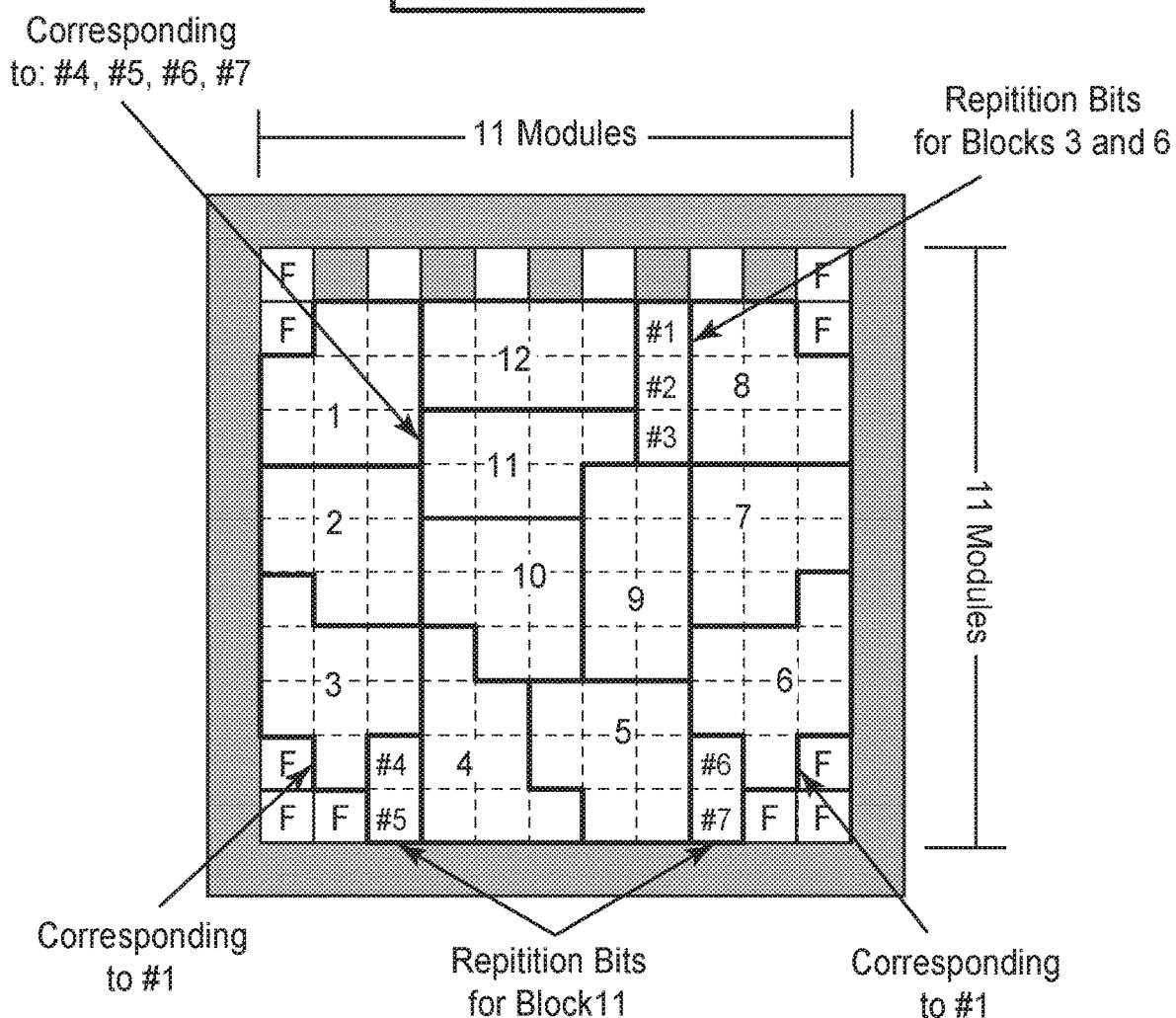
FIG. 15 illustrates repeating or repetition bits that may be included in an optical code, in accordance with one or more techniques of this disclosure.

FIG. 15 illustrates repeating or repetition bits that may be included in an optical code, in accordance with one or more techniques of this disclosure. For example, FIG. 15 demonstrates an example of using repeated bits. In FIG. 15, the certain bits from the data and error correction blocks are repeated and used in padding bits. This has the effect, in decoding, of allowing greater potential occlusion recovery.

In some examples an encoding procedure may be implemented by one or more computing devices. The encoding procedure may convert data into a pattern or other visual indicia comprised in an optical code. The following operations provide an example of an encoding for single resolution optical code, and a multi-resolution may be created by repeating the operations for each layer of data.

Operation 1: Code selection. The computing device selects an optical code, for example, based on parameters such as the number of data blocks and error correction blocks or any other suitable parameters.

Operation 2: Data encoding. The computing device converts a number or other value into a binary bit stream and break the bit stream into the selected block size.

Operation 3: The computing device may calculate the error correcting codes, which may include calculating the error correction data blocks for encoded data.

Operation 4: The computing device may structure a final message by appending the data and error correction codes from each block and adding repetition or padding bits.

Operation 5: The computing device may in conjunction with a construction device place modules in a matrix based on the final message. The computing device may cause the construction device to place the codeword modules in the matrix together with the finder and clocking pattern. For multi resolution optical codes, the finder and clocking pattern may only be placed on the largest module in some examples.

In some examples, encoding procedures may include one or more operations. For example, a computing device may determine the intended data payload for a given optical code layout. The number to be encoded may be converted to a big endian binary number. The computing device may then pad that number with leading zeros until the entire data bit space is consumed.

In some examples, the computing device may split the resulting bit stream into variable-bit codewords. The computing device may pad characters to fill a number of data codewords required for a version. In some examples, the computing device may analyze the input data string to determine its content and select the default or other appropriate Extended Channel Interpretation (ECI) and the appropriate mode to encode each sequence as described in this disclosure.

In some examples, a computing device may perform encoding with error correction codewords. The computing device may perform one or more operations to generate data and error correction codewords for both a single and multi-resolution optical code. For example, the computing device may determine an intended data payload for a given optical code layout. A number or value to be encoded may be converted by the computing device to a big endian binary number. That number may be padded by the computing device with leading zeros until the entire data bit space is consumed.

Various techniques for symbol printing and marking are described herein. For a single resolution optical code, the X dimension, for example, the width of the module, may be specified by user or machine-generated input that specifies parameters including but not limited to: distance to be read, the data payload desired for a fixed physical size symbol, the scanning technology used, and the technology used to produce the symbol, or any other suitable parameters. For the Y dimension, the height of a module may be equal to the X dimension in some examples, while in other examples X and Y dimensions may be different. In some examples, for a minimum quiet zone, a computing device may not define a quiet zone (white on dark, with a nonvisible light spectrum), but in other cases a minimum one module quite zone may be used, a minimum 2 modules of quiet zone may be used, or any other number greater than 1.

For a multi-resolution optical code, the X dimension, for example, the width of the smallest module may be specified by user or machine-generated input that specifies parameters including but not limited to: the distance to be read, the data payload desired for a fixed physical size symbol, the scanning technology used, the technology used to produce the symbol, or any other suitable parameter.

In some examples, each larger module size class may be a multiple of the smallest module size. The number of module size classes utilized may be based on amount of data to be encoded in an optical code, and a balance of larger module classes which can be decoded at a greater distance and smaller module classes which can contain higher data density may be generated. In some examples, a computing device may determine two module class sizes, although any defined class sizes are possible. For the Y dimension, the height of a module may be equal to the X dimension for a given module class in some examples, while in other examples, the X and Y dimensions may be different.

In some examples, a quiet zone size is based on a largest module size utilized by a computing device for the optical code, as are finder, timing and other overhead modules. The minimum quiet zone may be one class 1 (largest) module and in some examples, there may be 2 modules of quiet zone buffer. In other examples the minimum quiet zone and the quiet zone buffer sizes may be any number greater than zero.

In some examples, human-readable or human interpretable descriptions may be used. Human interpretable may mean in a form intended for human understanding. In some examples, an accompanying human readable description may accompany an optical code. However, in other examples, a human readable interpretation of data characters may not be practical. As an alternative, descriptive text rather than literal text may accompany the optical code. Character size and font may not be specified, and the message may be printed anywhere in an area surrounding the optical code. In some examples, the human readable interpretation may not interfere with the optical code itself nor the quiet zones, but may be printed over or under the optical code or its quiet zones if done so in a manner that does not interfere with functionality.

In some examples, symbol quality parameters may be defined and used. For grid non-uniformity, a grid may be calculated by using the finder patterns and alignment patterns as anchor points, as located by the use of a reference decode algorithm as provided in this disclosure. In some examples, a computing device may flatten an image in the event that the code is wrapped onto a curved surface in order to evaluate the uniformity of the grid. In the event an optical code is embodied onto a curved surface, the grid non-uniformity measurement may be performed by a computing device on an image which has already been flattened.

For a scan grade, the scan grade shall be a lowest (or below a threshold) of the grades for symbol contrast, modulation, fixed pattern damage, decode, axial non-uniformity, grid non-uniformity and unused error correction in an individual image of the symbol. The overall symbol grade may be an average of individual scans if more than one image is analyzed.

In some examples, a computing device may perform one or more decoding operations as described in herein. For example, the computing device may acquire an image of an optical code. The computing device may localize (e.g., identify) an optical code within image and convert light and dark modules into 1s (bright) 0s (dark) (or the reverse for inverted codes). The computing device may identify code size/style by searching for finder for candidate code styles. The computing device may extract Reed-Solomon code words using a code layout map. For styles including multiple resolutions, the computing device may resample code at one or more defined resolutions and use one or more defined layouts to extract additional code words. In some examples, the computing device may configure a Reed-Solomon decoder for appropriate code word sizes and error correction levels for each extracted code resolution, and the then the computing device may detect and correct errors for each. The computing device may generate or otherwise provide payloads which were correctable or required no correction for further processing in one or more operations described in this disclosure.

Figure 16:
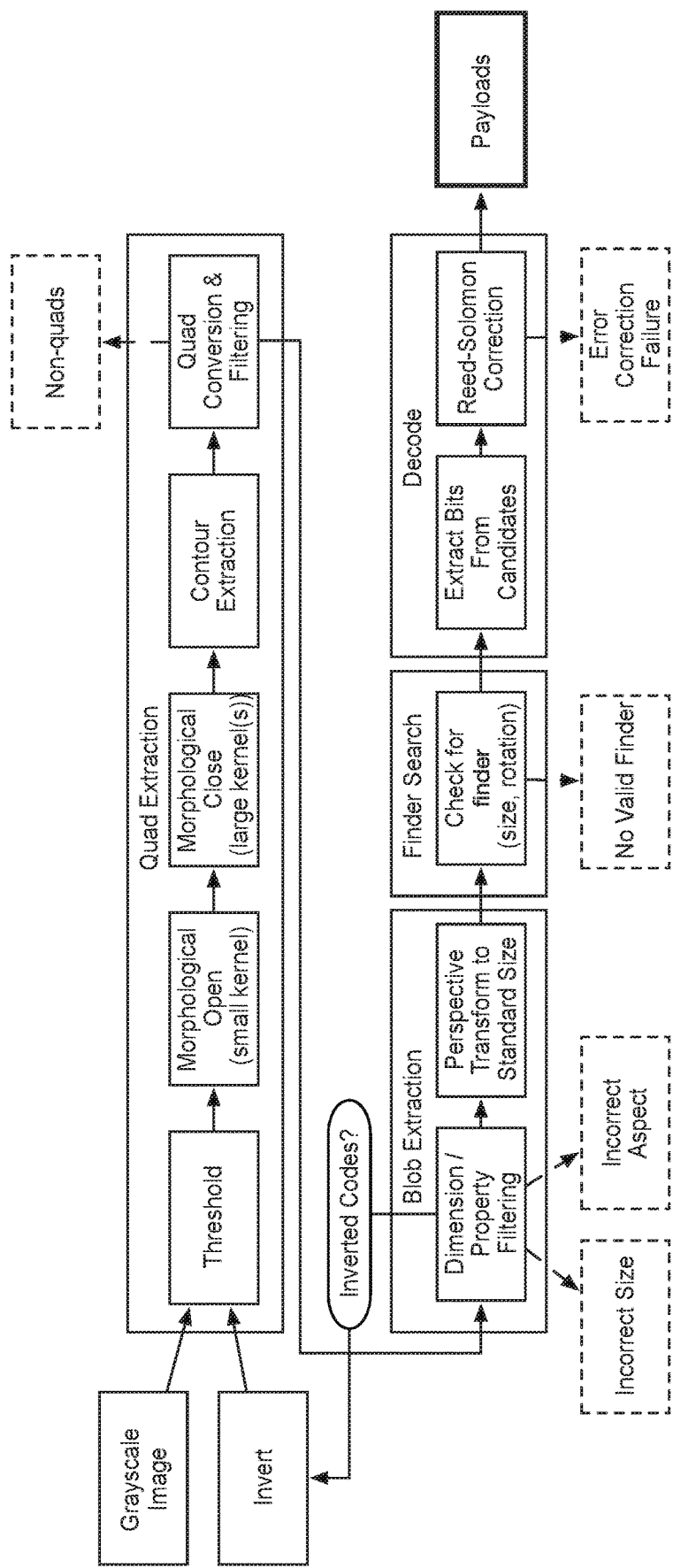
FIG. 16 illustrates a reference decode algorithm, in accordance with techniques of this disclosure.

FIG. 16 illustrates a reference decode algorithm, in accordance with techniques of this disclosure. The reference decode algorithm may implement a retroreflective paradigm where the optical code being recognized may be illuminated by a light source that is collocated with the imaging sensor with light intensity sufficient to make the code brighter than the surrounding environment.

As illustrated in FIG. 16, the reference decode may include one or more operations that comprise quad extraction. For instance, a computing device may determine one or multiple thresholds (e.g.: 80, 50, 33 for 8-bit images) for the image which is brighter that non-retroreflective elements in the image (ambient illumination from the sun or other light sources). The computing device may use this threshold to convert the image to a binary image (or images) of above and below threshold pixels. For second pass of inverted codes the computing device may use pixel value thresholds of 210, 230 for 8 bit images.

The computing device may perform a morphological open with a small kernel size (e.g.: 3×3 px rectangular, although any numbers greater than 0 may be possible) to remove point reflective elements and other bright artefacts in the image. In some examples, this operation may be skipped for the first pass with inverted code search. The computing device may perform a morphological close operation to connect optical code modules into single blobs, or for inverted codes to fill holes/defects in the surrounding bright quiet zone. For an inverted code, this kernel size may be small such as 9×9 px (although any numbers greater than 0 may be possible) since the image may have bright mostly contiguous quiet zones around the article on which the optical code is embodied. For non-inverted codes, the computing device may use multiple morphological open kernels handle codes at different sizes/scales (e.g. 15×15, 45×45, 90×90, although any numbers greater than 0 may be possible).

In some examples, the computing device may use a Ramer-Douglas-Peucker algorithm to re-approximate contour to a quadrilateral. The computing device may use an approximation accuracy (epsilon) which may reduce long edges to single segments (e.g. 0.2% of contour perimeter). In some examples, if greater than 4 segments remaining (signs with curved corners, shapes not well represented as a quad, etc.), the computing device may use longest 4 along with computation of their intersection points to pull out a bounding quad. Alternately (or in addition), the computing device may adjust epsilon until only 4 segments remain (used alone, without bounding box completion tends to result in more variable quad corner selection). In some examples, the computing device may check the resulting quadrilateral's aspect ratio (e.g.: 0.3-3) and corner angles (e.g.: std(angles) <10 degrees) to discard candidates that significantly differ (e.g., greater than a threshold) from a rectangle.

In some examples, the reference decode algorithm may perform blob extraction. For instance, a computing device may perform a perspective transform on the quadrilateral region of the quadrilateral to a standardized size (e.g.: a common multiple of the various code size edge lengths, 11×11 and 9×9→99×99, although any numbers greater than 0 may be possible. If searching for inverted codes, excess resolution may be provided to ensure it is significantly greater than 2 ppm for modules on an article. e.g.: 297×297 although any numbers greater than 0 may be possible). Use of higher order interpolation such as Lanczos interpolation over an 8×8 neighborhood may preserve code edges.

In some examples, the computing device may perform a $2^{nd}$ or multiple additional passes, which may be used if searching for inverted codes. The computing device may trim 5% of width from left edge, 5% of width from right edge, 5% of height from top, 5% of height from bottom. In the current instance, 5% is an example, although any other percentage greater than 1% may be used (e.g., a range of 1%-25%). The computing device may subtract 5% percentile value from image (darkens code). In some examples, the computing device may normalize max & min values to 0-255. The computing device may apply contrast limited adaptive histogram equalization with a clip limit of 1 and 4×4 grid. In other examples, the clip limit and grid size may be any numbers greater than one. The computing device may invert the image (e.g., 255−(pixel values)). The computing device may pad 55 pixels (or any other suitable number greater than zero) on each edge with mean value (larger than largest kernel used for morph close later).

The computing device may repeat quad and blob extraction and pass to the next phase of finder search. In some examples, the computing device may, for blob extraction, replace thresholds in quad extraction with pixel values of 210 and 230, although other example thresholds greater than 0 are possible. The computing device may use a 3×3 morph open kernel, although other dimensions greater than 0 on each dimension are possible. The computing device may replace kernel sizes for morphological close with 25×25, 35×24, 45×45, although any other dimensions, each of size greater than 0, are possible. The computing device may use output blob size of 108×108 for blob extraction, although any other dimensions, each of size greater than 1, are possible. The computing device may apply a bilateral filter with a diameter of 3 (although any diameter greater than 0 is possible), and sigma for both space and color of 40, although any sigma greater than 0 may be possible. In some examples, the computing device may normalize max & min values to 0-255. The computing device may invert the image (255−(pixel values)). The computing device may, if only searching for inverted codes, drop source blobs from first pass.

In some examples, the reference decode algorithm may perform a finder search. For example, a finder search implemented by a computing device may interpolate quad to optical code shapes being searched for (e.g.: 11×11, 9×9, N×N, or N×M), threshold, binarize, and compare to a finder module configuration in varying rotations. The computing device may score candidates by how many modules match the finder region.

In some examples, the reference decode algorithm may decode data from the optical code. For instance, the computing device may use a binarized image from highest or high scoring candidate(s) from finder search and extract code words according to corresponding code layout. In some examples, bright sections reflect binary 1s, dark sections reflect zeroes (for inverted codes this is the opposite in the original image capture). The computing device may interpolate the original image and binarize for any additional resolutions of codes present and extract codewords using appropriate layout map. The computing device may configure Reed-Solomon error correction for a corresponding code style's block size(s), correctable block(s) and perform error correction as described in this disclosure. In some examples, the computing device may generate or provide payload(s) for codes which are correct or correctable using error correction for use in one or more operations described in this disclosure.

Figure 17:
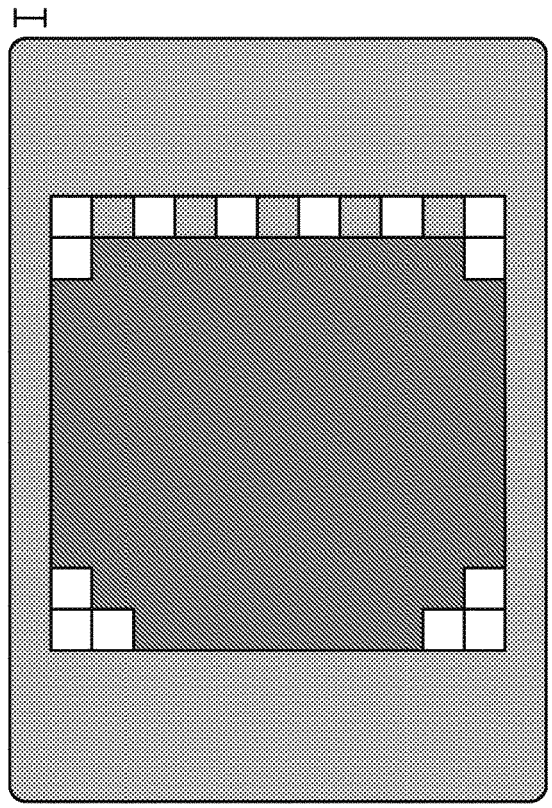
FIGS. 17-18 illustrate module clearances for optical codes embodied on articles, in accordance with techniques of this disclosure.
Figure 18:
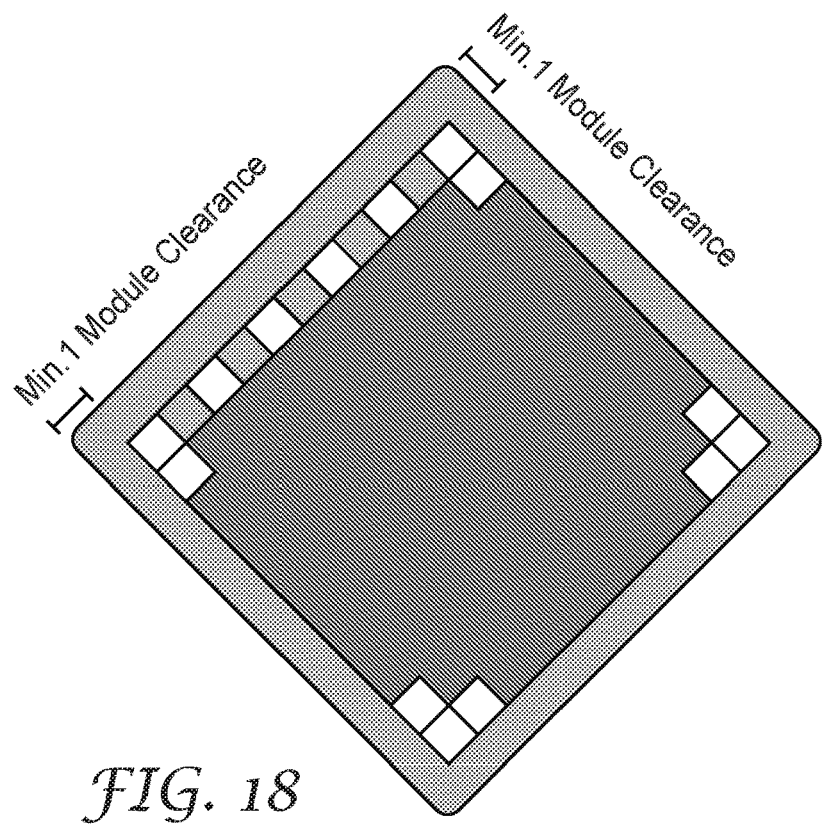

FIGS. 17-18 illustrate module clearances for optical codes embodied on articles, in accordance with techniques of this disclosure. FIG. 17 illustrates a sample optical code layout with 1 module clearance at an edge. FIG. 18 illustrates an alternate 45-degree counter-clockwise rotated layout on a diamond article shape (e.g., an infrastructure article).

Optical codes may be embodied on articles or signage so that a clocking edge of the code as shown in FIGS. 17-18 are oriented towards the top of the sign (e.g., FIG. 17). In some examples, this is done so that additional assumptions may be made when a computing device locates and decodes codes within a scene. In some examples, optical codes may extend up to 1 module from the sign edge so as to leave a quiet zone but also to maximize the module sizes within the code. In some examples, there is no maximum and/or minimum quiet zone.

For an inverted code style, the quiet zone/edge clearance may increase to a minimum of 2 modules in size. There may be no maximum quiet zone in this configuration, however the blob extraction during the first pass may leave sufficient resolution on the code modules for decoding (at least 2 ppm but potentially larger).

Some variations are allowed to enable maximum size of the code relative to sign size, such as with diamond shaped signs where the clocking edge can be oriented to be parallel with the upper left edge of the sign (rotated 45-degrees counter clockwise, FIG. 18). However, if an optical code can be placed on a sign with at least one module of clearance in the non-rotated layout (clocking along upper edge), this may improve and/or maximize imaging performance.

In some examples, a computing device may perform error detection and/or use correction primitive polynomials. Reed Solomon error correction may be implemented by a computing device to operate under a Galois Field (gf). An optical code may force this field to be of type $gf(2^m)$. In some examples, values of m are 6 or 8. Although m may be any value greater than zero, such values as 6 or 8 may be selected as a trade-off between code density/code size, and the decode false positive rate. In some examples, as the value of m increases, the optical code will be larger in size and have a lower false positive decode rate.

Table 2 provides primitive polynomials for a field size of up to $gf(2^{16})$.

TABLE 2

Primitive polynomials for a given Galois field

| m | Default Primitive Polynomial | Integer Representation |
|---|---|---|
| 3 | $D^3 + D + 1$ | 11 |
| 4 | $D^4 + D + 1$ | 19 |
| 5 | $D^5 + D^2 + 1$ | 37 |
| 6 | $D^6 + D + 1$ | 67 |
| 7 | $D^7 + D^3 + 1$ | 137 |
| 8 | $D^8 + D^4 + D^3 + D^2 + 1$ | 285 |
| 9 | $D^9 + D^4 + 1$ | 529 |
| 10 | $D^{10} + D^3 + 1$ | 1033 |
| 11 | $D^{11} + D^2 + 1$ | 2053 |
| 12 | $D^{12} + D^6 + D^4 + D + 1$ | 4179 |
| 13 | $D^{13} + D^4 + D^3 + D + 1$ | 8219 |
| 14 | $D^{14} + D^{10} + D^6 + D + 1$ | 17475 |
| 15 | $D^{15} + D + 1$ | 32771 |
| 16 | $D^{16} + D^{12} + D^3 + D + 1$ | 69643 |

In some examples, a computing device may use a Reed Solomon error correction algorithm under $gf(2^m)$ to encode and/or decode an optical code of this disclosure. There are numerous potential algorithms to decode a Reed Solomon code. The following operations are those used by a computing device in accordance with this disclosure, although many other operations are possible. The computing device may compute the syndromes polynomial given the received codeword message and the number of error correcting symbols. The computing device may assume erasures are not handled and compute the Forney syndromes from the original syndromes. The computing device may compute the error locator polynomial using the Berlekamp-Massey algorithm. The computing device may use the Chien search algorithm with the error locator polynomial to calculate error positions. Given the error positions, the computing device may solve the error and return the resulting data.

Figure 19:
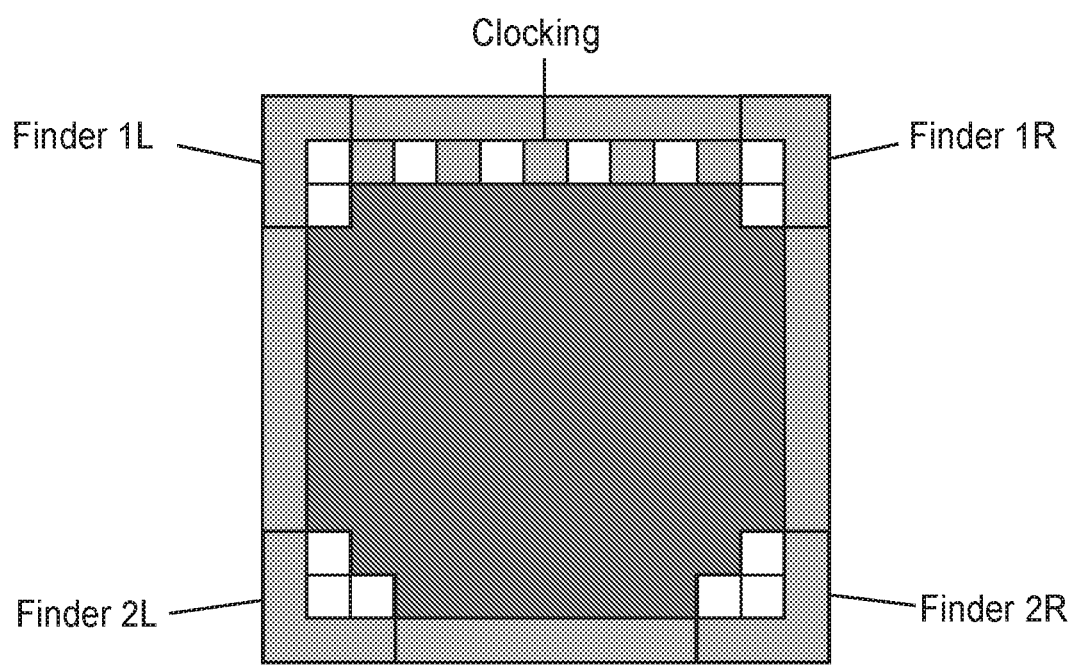
FIG. 19 illustrates an optical code with fixed pattern information, in accordance with techniques of this disclosure.

FIG. 19 illustrates an optical code with fixed pattern information, in accordance with techniques of this disclosure. For fixed pattern damage to an optical code, features including, but not limited to, the following may be assessed: (a) Finder patterns including: an upper left finder pattern of two modules and 4 quiet zone modules (finder 1L), an upper right finder pattern of two modules and 4 quiet zone modules (finder 1R), a lower left 3-module finder pattern and 5 quiet zone modules (Finder 2L), a lower right 3-module finder pattern and 5 quiet zone modules (Finder 2R); and (b) timing information comprising the patterned row of modules between the left and right finder (Clocking).

For fixed pattern damage grading, damage to each segment of the fixed pattern may be graded by a computing device based on the number of modules scored incorrectly within that segment. An overall fixed pattern damage grade may then be assigned by a computing device based on the lowest score of any individual segment.

The computing device may perform an image bianarization on a candidate grey-scale image. (calculate a threshold based on a midpoint between the minimum and maximum grey-scale value. The computing device may score a 1 for anything over the midpoint and a 0 for anything under).

For each segment follow the procedure below to score, the computing device may (a) compare the resulting bianarized modules with the expected values for each module for a given segment (b) count a number of disagreements and (c) apply a segment grade based on the number of errors as scored in Table 3 below:

TABLE 3

Scoring chart for fixed pattern segments

| Segments Finder L1, L2, R1, R2 | Clocking | Score |
|---|---|---|
| 0 | 0 | 4 |
| 1 |   | 3 |
| 2 | 1 | 2 |
| 3 |   | 1 |
| >3 | >1 | 0 |

In some examples, a scan grade may be the lowest of the grades for the standard parameters evaluated according to ISO/IEC 15415 and the grades for fixed pattern damage evaluated in accordance with this disclosure.

In some examples, dynamic environments, such as work zones may provide more difficulty for autonomous or semi-autonomous vehicles. For instance, relying on enhanced maps and GPS may have limitations because hazards or workers may be dynamically relocated on minute-by-minute or hour-by-hour basis. Computing device 540, when implemented in a vehicle such as an autonomous, semi-autonomous or vision-assisted vehicle may provide real-time navigational markers with codes as described in this disclosure that allow such vehicles to reliably locate, people and devices and navigate through such areas, even if portions of the code are visually occluded by other objects or occlusions in the areas. In some examples, as described in this disclosure, codes are invisible to the human eye but are visible in specific wavelengths of light to commercially available machine sensors. These unique machine-readable codes that may be attached to the work zone devices, may provide precise object detection and rapid processing to enable autonomous, semi-autonomous, or vision-assisted navigation. As such, a vehicle that include a computing device and image capture device such as described in this disclosure may alter its operation in response to determining information encoded in one or more codes.

In some examples, machine-readable optical codes and systems for reading such codes in this disclosure are compatible with existing Manual on Uniform Traffic Control Devices (MUTCD) rules and/or with conventional work zone materials. In some examples, machine-readable optical codes of this disclosure may provide information for faster and/or more accurate detection and processing by vehicles than other modalities (e.g., GPS, maps, etc.) for navigating vehicles. In some examples, universal machine-readable optical codes may be standardized or constant for each particular type of article to which the code is embodied on. In some examples, distinct machine-readable codes may be used for different types of articles in particular work zones or other bounded regions or areas. In some examples, a machine-readable code may include a unique spatial configuration of optical elements and/or information encoded therein that represents a human or a worker.

In some examples, localization data may be encoded in the machine-readable code, where such localization information indicates locality specific information about the article or surrounding area of the article, and in some examples, may not be available in GPS or maps because of the dynamically changing environment in which the code is located. In addition to improving classification and data quality of signs, infrastructure articles may provide an opportunity to supplement location data provided by high definition mapping. Mapping companies are creating extremely detailed and dynamic maps to help drivers and automated vehicles plan routes and to position the vehicle appropriately on the roadways. Current high-definition (HD) mapping relies on continuous analysis of SIFT (Scale Invariant Feature Transform) features to provide localization. In order to develop reliable features, an data dense mapping may occur and be stored in an accessible way by the vehicle to reference. In some instances, this is both time consuming and expensive (both in economic and computation terms). In some instances it is also possible that the landmarks used as SIFT features will change, challenging the vehicle while it is attempting to perform its SLAM (Simultaneous Localization and Mapping).

Techniques of this disclosure may alleviate the computational expense by embedding information into signage which can give precise GPS information, as well as reduce the ambiguity or error-prone action of matching SIFT features with point cloud data.

Some optical codes may contain high precision GPS coordinates as well as a unique-to-the-sign identifier. Finder and timing modules on the optical code may allow for accurate read distance vector determination using planar pose estimation techniques. A computing device combining this distance vector and the decoded GPS coordinates specify a reference position to compare current GPS coordinates, providing and offset/drift/error correction and thus localization, even in an urban canyon (for example) where GPS data may be unreliable.

As an example, a vehicle machine vision system captures an image of a sign in infrared light exposing its embedded optical code. The finder module size and skew allows for normalization by a computing device of that image back to square. The size of the module may be measured by a number of pixels spread between two separated finder modules. This pixel count correlates to pixel size, which is proportionate to distance, allowing a vector determination by a computing device based on the amount of skewedness of the image, and the pixel size to tell a specific distance and direction to the sign. With a high precision GPS coordinate of the sign location, and the accurate projection of where the camera is, as long as the vehicle knows where the camera is located on the vehicle, a GPS location of the vehicle can now be determined by a computing device from the provided sign GPS and appropriate translation vector.

Using uniquely identified road signs or other articles for localization may be preferred over reliance on SIFT features because the sign may actively confirm the coordinate location and sign ID making it less likely that an incorrect or false match will occur. Point cloud data or scale invariant feature lists may not actually have any unique identifiers other than the shapes themselves. This often leaves the vehicle reasonably sure, but not certain it has chosen a set of points or feature to correlate to a specific place on the earth. Meaning, the vehicle probably was correct in its identification but could be incorrect and the vehicle will not know until it starts to now miss expected features as it has incorrectly localized. Techniques of this disclosure using optical codes for localization may provide improved confidence and/or certainty.

Using a sign or other article that has a unique id as well as high precision location may provide a confirmation or additional confidence information that the correct sign was identified and its location is verified. Even if a vehicle does not need to use the stored GPS coordinates of the sign, the vehicle can match the GPS coordinates to an expected SIFT feature. This may provide a positive ID to that SIFT feature, which may enable an increased level of trust in that association. In some examples, a security element may be introduced to certify a particular sign is the exact sign it says it is, and is not spoofed or otherwise invalid.

In some examples, optical codes may be used as a source of ground truth to train other systems or models. Example models may include neural networks, SVM classifiers, or any other supervised learning models. The data encoded in an optical code may be used as ground truth information to trans such models. As an example, data from the optical code, such as localization data, may be structured in a feature vector along with any other features and used to classify, for example, image data. An example classification may include classifying whether image data indicates a particular road sign. By including ground truth information in the feature vector that is applied to the model, the model may more accurately classifying the image data as including the particular road sign. Digitally certain data (e.g., optical code data with some ECC) used in conjunction with non-digitally certain data (e.g., poorly resolved image data) may improve classification of the non-digitally certain data. Although described in the context of classifying image data for a road sign, the techniques of using ground truth from an optical code may be more generally applied to any scenario of using digitally certain data to make a classifier for non-digitally certain data more accurate. Such techniques may provide an extra signal for the classifier, or operate as a check to validate that the result of classifier is correct.

The present disclosure may provide a variety of advantages over existing barcode technology. For example, the present disclosure allows for information to be read from a barcode by a machine vision system even when a portion of the barcode is occluded. This provides advantages in situations where signs or articles containing barcodes are damaged, or where visibility of the sign is blocked by dirt, snow, other interfering objects or natural curvature of a roadway. Specifically, the present disclosure provides the ability to recover from edge occlusion, even in the instance when an entire edge of a code is occluded. This is in contrast to error correction designed to address random or distributed error throughout the area of the code. Having the ability to recover from edge occlusion provides an effective solution for environments where occlusions or errors in reading a code are most likely to be concentrated to a single area of the code, as can be the case of codes on signs or codes used in a traffic context.

In one instance, the present disclosure includes a two-dimensional machine-readable optical code with error correction. The optical code comprises a plurality of optical elements arranged in a matrix configuration comprising rows and columns; where the plurality of optical elements encodes data. If any one of the top row, bottom row, right column or left column of the matrix is occluded, the data encoded in the optical elements can be accurately decoded.

In some instances the plurality of optical elements includes a plurality of finder optical elements, and, the finder optical elements enable a machine vision system to localize the optical code within an image. In some instances, the optical code includes fewer than 36 finder optical elements.

In some instances, the plurality of optical elements further comprises a plurality of context optical elements representing context information, wherein the context optical elements are detectable by a machine vision system from a first distance.

In some instances the plurality further comprise a plurality of content optical elements representing content information, wherein the content optical elements are not detectable by a machine vision system and a first distance but are detectable by a machine vision system from a second distance, and wherein the second distance is lesser than the first distance.

In some instances, the context optical elements and the content optical elements are arranged in a manner to allow Reed-Solomon error correction.

In some instances, the optical code represents at least 736 bits of data.

In some instances, the content optical elements include instructional information.

In some instances, the context optical elements include installation, location or manufacturer information.

In another embodiment, the present disclosure includes a sign comprising a substrate, a film layer, and an optical code as described herein. In some instances, the sign further comprises a retroreflective layer.

In another embodiment, the present disclosure includes a system for reading a two-dimensional machine-readable optical code. The system comprises a sign. The sign includes a substrate and a two-dimensional machine-readable optical code. The optical code comprises a plurality of optical elements arranged in a matrix configuration comprising rows and columns; wherein the plurality of optical elements encodes data; and wherein if any one of the top row, bottom row, right column or left column of the matrix is occluded, the data encoded in the optical elements can be accurately decoded. The system further comprises a machine vision system for detecting and processing the two-dimensional machine-readable optical code.

In another embodiment, the present disclosure comprises a method of reading a two-dimensional machine-readable optical code with error correction. The method comprises detecting, with a machine vision system, a plurality of optical elements arranged in a matrix configuration comprising rows and columns, wherein the plurality of optical elements encodes data; and decoding the data, wherein if any one of the top row, bottom row, right column or left column of the matrix is occluded, the data encoded in the optical elements can be accurately decoded.

In some instances, the plurality of optical elements includes a plurality of finder optical elements, and wherein the finder optical elements enable a machine vision system to localize the optical code within an image.

In some instances, the optical code includes fewer than 36 finder optical elements.

In some instances, wherein the plurality of optical elements further comprise a plurality of context optical elements representing context information, wherein the context optical elements are detectable by a machine vision system from a first distance; and a plurality of content optical elements representing content information, wherein the content optical elements are not detectable by a machine vision system and a first distance but are detectable by a machine vision system from a second distance, and wherein the second distance is lesser than the first distance.

In some instances, the context optical elements and the content optical elements are arranged in a manner to allow Reed-Solomon error correction.

In some instances, the optical code has a size of 7×7 and represents at least 63 bits of data.

In some instances, the content optical elements include instructional information.

In some instances, the context optical elements include installation, location, or manufacturer information.

In some instances, the sign further comprises a retroreflective layer.

Barcodes have been used in a variety of vehicle applications. When used in vehicle applications, barcodes can be on a license plate or a sign. Barcodes can be read using a machine vision system, which in some instances may be an automatic vehicle recognition (AVR) system. Exemplary uses of such systems are, for example, automatic tolling (e.g., electronic toll systems), traffic law enforcement (e.g., red light running systems, speed enforcement systems), detection of information on traffic signs or other elements of transportation infrastructure, searching for vehicles associated with crimes, access control systems, and facility access control. Ideal machine vision systems provide highly accurate (i.e., 100% accurate) results and are able to read barcodes from a distance at high accuracy.

Reading a bar code on a license plate, sign or any other uncontrolled environment poses a variety of challenges, including: (1) varying reflective properties of the license plate materials or sign; (2) varying resolution of the machine vision system; (3) the relative speed of the object the machine vision system is mounted to as compared to the object with the bar code; (4) wide variances in ambient illumination; (5) license plate or sign mounting location and/or tilt; (6) occlusion of the license plate or sign by, for example, other vehicles, dirt, snow, articles on the roadway, natural barriers; (7) vertical or horizontal curvature of a roadway, etc.

Barcodes on signs and license plates are discussed in a number of patents and applications. Some publications (e.g., European Patent Publication No. 0416742 and U.S. Pat. No. 6,832,728) discuss including one or more of owner information, serial numbers, vehicle type, vehicle weight, plate number, state, plate type, and county on a machine-readable portion of a license plate. PCT Patent Publication No. WO 2013-149142 describes a barcode wherein framing and variable information are obtained under two different conditions. In some embodiments, the framing information is provided by human-readable information, and variable information is provided by machine-readable information. European Patent Publication No. 0416742, U.S. Pat. No. 6,832,728, and PCT Patent Publication No. WO 2013-149142 are all incorporated in their entirety herein.

Some prior art methods of creating high contrast license plates and signs involve including materials that absorb in the infra-red wavelength range and transmit in the visible wavelength range. For example, U.S. Pat. No. 6,832,728 describes license plates including visible transmissive, infra-red opaque indicia. U.S. Pat. No. 7,387,393 describes license plates including infra-red blocking materials that create contrast on the license plate. U.S. Pat. No. 3,758,193 describes infra-red transmissive, visible absorptive materials for use on retroreflective sheeting. The entirety of U.S. Pat. Nos. 3,758,193 and 7,387,393 are incorporated herein by reference.

The entireties of U.S. Provisional Applications identified by 62/485,449 and 62/485,471, each filed on Apr. 14, 2017, are incorporated herein by reference.

Another method of creating high contrast license plates for use in ALPR systems is described in U.S. Patent Publication No. 2010-0151213 and involves positioning an infrared-reflecting material adjacent to an optically active (e.g., reflective or retroreflective) substrate such that the infrared-reflecting material forms a pattern that can be read by an infrared sensor when the optically active substrate is illuminated by an infrared radiation source. The entirety of U.S. Patent Publication No. 2010-0151213 is incorporated herein by reference. As described in this disclosure, the level and design of error correction may determine how much of the code can be damaged, in blocked line of sight, or otherwise obscured or obfuscated while the barcode itself can still be read.

While a specific method for nesting content and context optical elements is described herein, other methods in the scope of the present disclosure will be apparent to one of skill in the art upon reading the present disclosure.

It will be clear to a person skilled in the art that features described in relation to any of the embodiments described above can be applicable interchangeably between the different embodiments. The embodiments described above are examples to illustrate various features of the disclosure.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. An article comprising:
    a substrate that includes a physical surface;
    an optical code embodied on the physical surface and comprising a top edge, a bottom edge opposite the top edge, a left edge coupling the top edge and the bottom edge, a right edge opposite the left edge and coupling the top edge and the bottom edge, and a plurality of optical elements, and
    a quiet zone surrounding the optical code to visually separate the optical code from another region of the physical surface,
    wherein a first subset of the optical elements form a clocking pattern disposed along a top edge of the optical code,
    wherein a second subset of the optical elements form a finder code, wherein the finder code includes a plurality of portions, wherein each portion of the plurality of portions is disposed along a respective corner of the optical code, wherein the portion of the finder code disposed along each respective corner of the optical code includes at least two optical elements,
    wherein a third subset of the optical elements form a message,
    wherein a fourth subset of the optical elements form error correction data,
    wherein a fifth subset of the optical elements form repetition bits, wherein each optical element of the fifth subset of elements corresponds to a respective optical element of the subset of optical elements that form the message or the error correction data, and wherein each optical element of the fifth subset of elements is disposed within four optical elements from a particular edge of the optical code that is opposite an edge of the optical code that includes the corresponding optical element of the message or the error correction data,
    wherein each respective optical element of the third subset of optical elements and the fourth subset of optical elements represents an encoded bit in a set of encoded bits, wherein the set of encoded bits are differentiable based on visual differentiability of the respective optical elements, and
    wherein the third subset of optical elements forming the message and the fourth subset of optical elements forming the error correction data are spatially configured in a matrix such that the message is decodable from the substrate without optical elements positioned within at least one complete edge of the matrix that is visually occluded.

2. The article of claim 1, wherein the at least one complete edge comprises a one-dimensional array from the lowest ordered index to the highest-ordered index of at least a horizontal or a vertical dimension of the matrix.

3. The article of claim 1, wherein the plurality of optical element sets are not included in a QR code.

4. The article of claim 1, wherein a parent optical element set included in the third subset of optical elements or the fourth subset of optical elements includes at least one parent optical element, wherein the parent optical element further includes a child optical element set, the child optical element set including a respective set of child optical elements.

5. The article of claim 4,
    wherein each parent optical element of the parent optical element set represents a respective encoded bit, wherein the encoded bit represented by each respective parent optical element is based on an cumulative visual appearance of a corresponding child optical element set and is decodable at a distance between an image capture device and the article that is greater than or equal to a threshold distance, and wherein each child optical element of the child optical element set represents a respective encoded bit, wherein the encoded bit represented by each respective child optical elements in the child optical element set is not decodable at the distance between the image capture device and the article.

6. The article of claim 5, wherein the distance is a first distance, wherein the encoded bits represented by each respective child optical elements in the child optical element set are decodable at a second distance between the image capture device and the article, the second distance between less than the first distance.

7. The article of claim 5, wherein the threshold distance is a distance at which a resolution of an image captured by the image capture device does not visually differentiate, above a differentiability threshold, between one or more child optical elements of the child optical element set that are visually different.

8. The article of claim 1, wherein the set of encoded bits include N-number of encoded bits, wherein an optical element set includes M-number of optical elements, wherein an optical element set represents a combination of encoded bits of a set of $N^M$ combinations of encoded bits based at least in part on respective visual gradient values assigned to respective optical elements of the optical element set, wherein the respective gradient values are each included in a set of M-number of visually differentiable gradient values.

9. The article of claim 1, wherein the error correction data is based on an application of an error correction function to the message.

10. The article of claim 1,
wherein each optical element of a first optical element set that includes a first plurality of optical elements is a first size,
wherein each optical element of a second optical element set that includes a second plurality of optical element is a second size smaller than the first size, and
wherein the first and second optical element sets do not overlap.

11. The article of claim 10,
wherein the first optical element set represents context information that is descriptive of the article, and
wherein the second optical element set represents content information that is descriptive of the context information.

12. The article of claim 1, wherein the finder code enables a machine vision system to localize the optical code within an image.

13. The article of claim 1, wherein the finder code includes a plurality of optical elements arranged symmetrically about a center axis of the matrix.

14. The article of claim 1, wherein the optical code is orientation independent.

15. The article of claim 1, wherein:
the finder code is a dark color and the quiet zone is a light color, or
the finder code is the light color and the quiet zone is a dark color.

16. The article of claim 1, wherein the article includes human readable data.

17. The article of claim 1, wherein the article comprises at least one of a traffic sign, a license plate, a garment, or a decal.

18. A method comprising:
receiving, by a computing device an image of an article having a substrate that includes a physical surface,
wherein the image includes a representation of an optical code disposed on the article and a quiet zone surrounding the optical code to visually separate the optical code from another region of the physical surface,
wherein the optical code includes:
a top edge, a bottom edge opposite the top edge, a left edge coupling the top edge and the bottom edge, a right edge opposite the left edge and coupling the top edge and the bottom edge, and a plurality of optical elements,
wherein a first subset of the optical elements form a clocking pattern disposed along a top edge of the optical code,
wherein a second subset of the optical elements form a finder code, wherein the finder code includes a plurality of portions, wherein each portion of the plurality of portions is disposed along a respective corner of the optical code, wherein the portion of the finder code disposed along each respective corner of the optical code includes at least two optical elements,
wherein a third subset of the optical elements form a message,
wherein a fourth subset of the optical elements form error correction data,
wherein a fifth subset of the optical elements form repetition bits, wherein each optical element of the fifth subset of elements corresponds to a respective optical element of the subset of optical elements that form the message or the error correction data, and wherein each optical element of the fifth subset of elements is disposed within four optical elements from a particular edge of the optical code that is opposite an edge of the optical code that includes the corresponding optical element of the message or the error correction data,
wherein each respective optical element of the third subset of optical elements and the fourth subset of optical elements represents an encoded bit in a set of encoded bits, wherein the set of encoded bits are differentiable based on visual differentiability of the respective optical elements,
wherein the third subset of optical elements forming the message and the fourth subset of optical elements forming the error correction data are spatially configured in a matrix such that the message is decodable from the substrate without optical elements positioned within at least one complete edge of the matrix that is visually occluded, and
decoding, by the computing device, the message based at least in part on error correction data from the image in which at least one complete edge of the matrix that is visually occluded.

19. The method of claim 18, wherein the at least one complete edge comprises a one-dimensional array from the lowest ordered index to the highest-ordered index of at least a horizontal or a vertical dimension of the matrix.

20. The method of claim 18, wherein the plurality of optical element sets are not included in a QR code.

* * * * *